(12) United States Patent
Hasunuma

(10) Patent No.: US 11,339,911 B2
(45) Date of Patent: May 24, 2022

(54) FLUID TRANSFER CONNECTOR

(71) Applicant: Surpass Industry Co., Ltd., Saitama (JP)

(72) Inventor: Masahiro Hasunuma, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 357 days.

(21) Appl. No.: 16/511,475

(22) Filed: Jul. 15, 2019

(65) Prior Publication Data
US 2020/0032947 A1    Jan. 30, 2020

(30) Foreign Application Priority Data

Jul. 27, 2018    (JP) .............................. JP2018-141408

(51) Int. Cl.
    *F16L 21/03*      (2006.01)
    *F16L 58/18*      (2006.01)

(52) U.S. Cl.
    CPC ............. *F16L 58/185* (2013.01); *F16L 21/03* (2013.01)

(58) Field of Classification Search
    CPC ......... F16L 58/185; F16L 21/03; F16L 55/07; F16L 37/23; F16L 37/32; F16L 37/40
See application file for complete search history.

(56) References Cited

U.S. PATENT DOCUMENTS

| | | | | | |
|---|---|---|---|---|---|
| 3,367,366 | A | * | 2/1968 | Klatte ..................... | F16L 37/35 137/614.05 |
| 4,200,121 | A | * | 4/1980 | Walter .................... | F16L 37/32 137/614 |
| 5,649,563 | A | * | 7/1997 | Shimano ................. | F16K 1/446 137/240 |
| 2004/0211474 | A1 | * | 10/2004 | Mikiya ................... | F16L 37/23 137/614.04 |
| 2009/0272450 | A1 | | 11/2009 | Hasunuma | |
| 2010/0001517 | A1 | * | 1/2010 | Hasunuma .............. | F16L 37/40 285/315 |
| 2017/0059076 | A1 | * | 3/2017 | Hasunuma .............. | F16K 17/04 |
| 2020/0018434 | A1 | * | 1/2020 | Hasunuma .............. | F16L 37/23 |
| 2020/0032915 | A1 | * | 1/2020 | Imai ....................... | F16L 37/32 |

FOREIGN PATENT DOCUMENTS

JP      5046958 B2      10/2012

* cited by examiner

*Primary Examiner* — Matthew Troutman
*Assistant Examiner* — James A Linford
(74) *Attorney, Agent, or Firm* — Hamilton, Brook, Smith & Reynolds, P.C.

(57) ABSTRACT

A liquid transfer connector according to the present disclosure is provided with a plug having a plug body in which a fluid channel is formed, a socket having a socket body in which a fluid channel communicating with the fluid channel is formed when the plug is connected, a plug body housing part provided in the socket body, that receives and houses a distal end of the plug body inserted therein at a time of connection, an O-ring provided in the plug body housing part, that seals an outer periphery of the plug body inserted in the socket body and a cleaning liquid supply hole that supplies a cleaning liquid into the plug body housing part at a position opposite to the distal end of the plug body with respect to the O-ring.

4 Claims, 20 Drawing Sheets

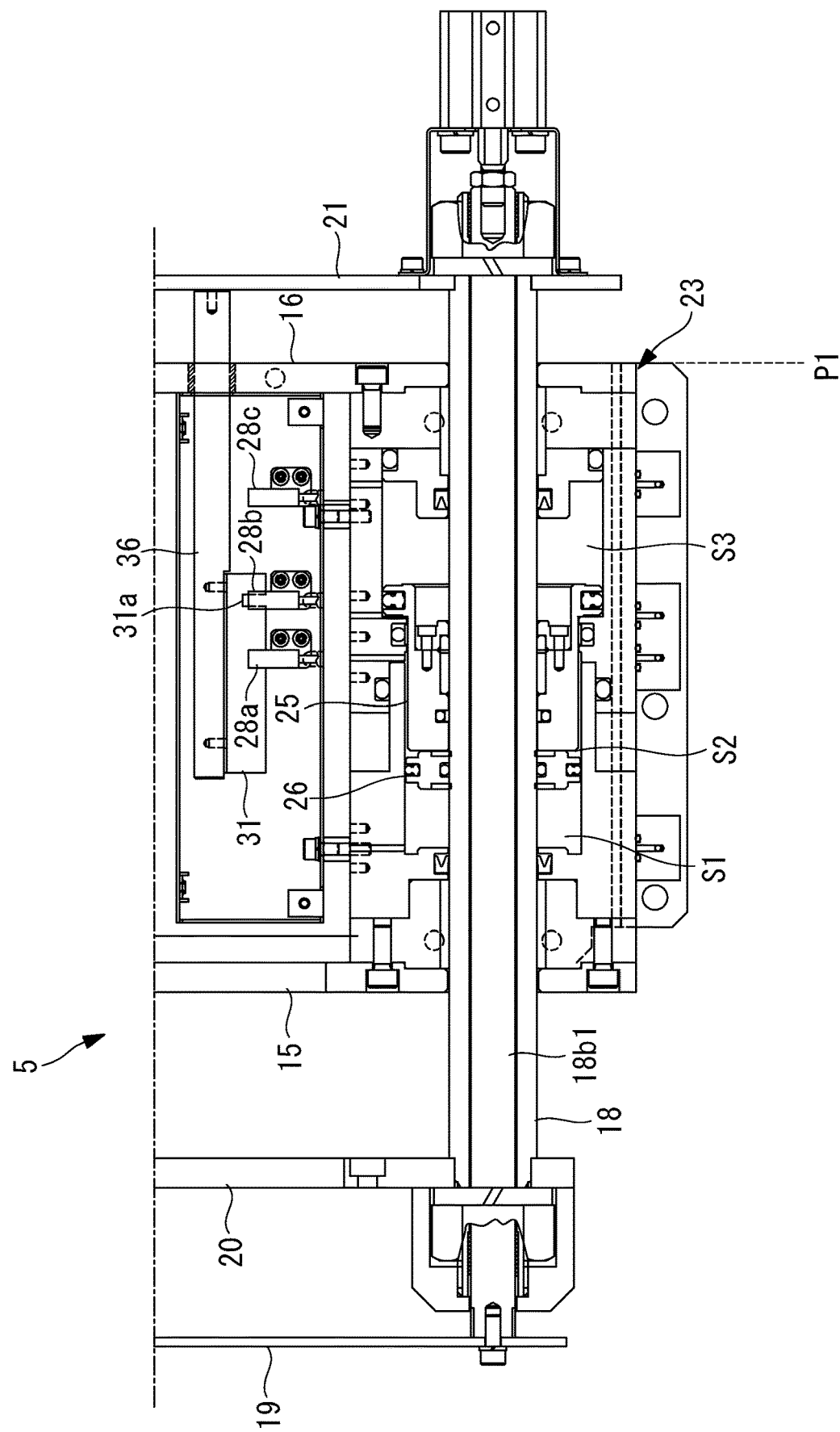

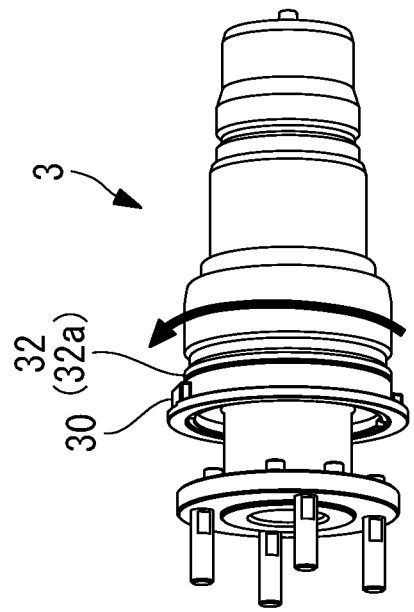
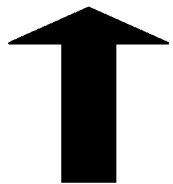
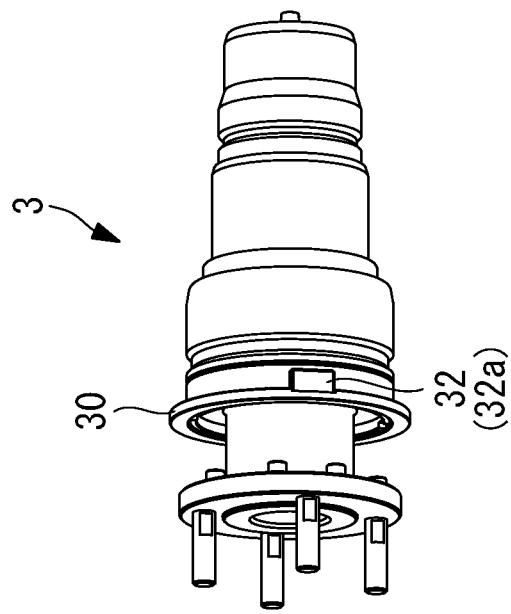
FIG. 6

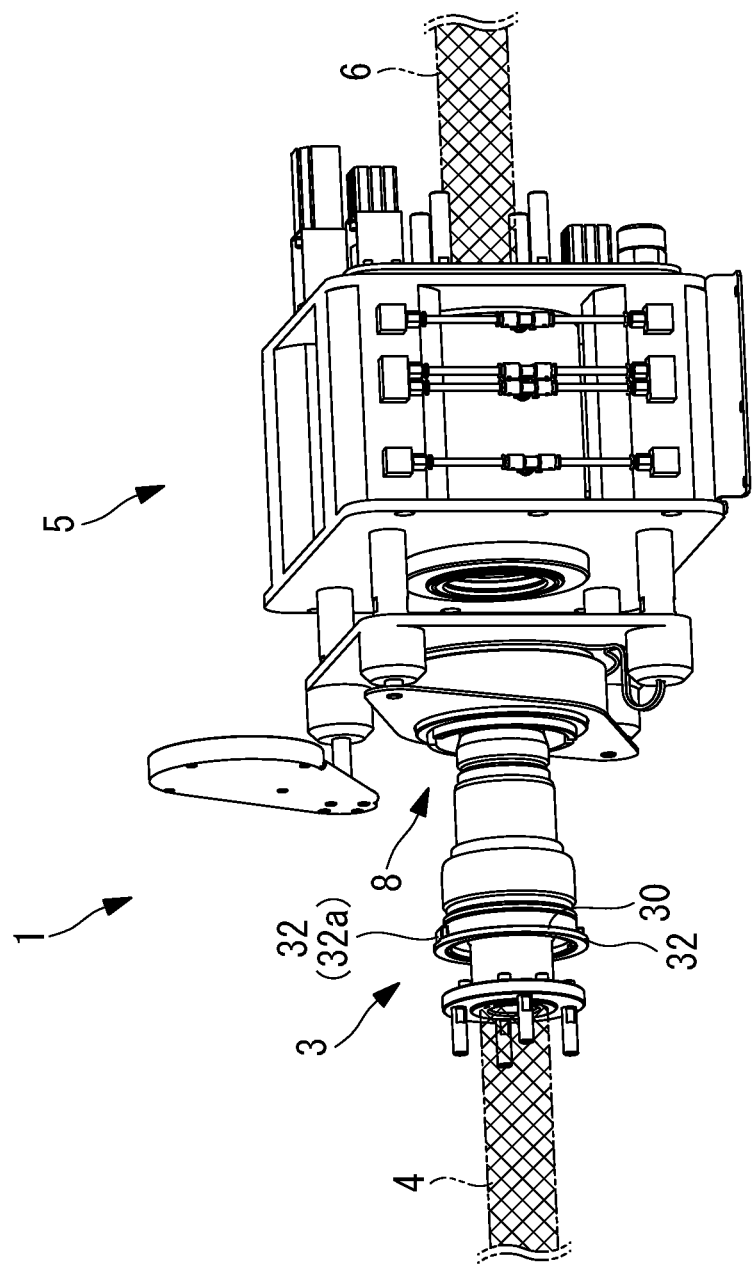

FLUID TRANSFER CONNECTOR

CROSS-REFERENCE TO RELATED APPLICATIONS

This application claims priority under 35 U.S.C. § 119 or 365 to Japanese, Application No. 2018-141408, filed Jul. 27, 2018. The entire teachings of the above application are incorporated herein by reference.

TECHNICAL FIELD

The present disclosure relates to a fluid transfer connector to transfer, for example, liquid chemicals or gas for use in semiconductor manufacturing apparatuses.

BACKGROUND ART

A fluid transfer connector is used to transfer a fluid (liquid chemical or gas) for use in semiconductor manufacturing apparatuses, as disclosed in, for example, PTL 1, cited below. The fluid transfer connector may include a socket and a plug. The socket may be fixed to a building in which a buffer tank for temporarily storing the fluid is installed. The plug may be fixed to a distal end of a hose extended from a tanker truck. Connecting the plug to the socket enables the fluid to be transferred from the tanker truck to the buffer tank.

As described in the aforementioned document, after inserting the plug into an insertion port on the socket side and fixing the plug, the distal end of the plug and the distal end of the socket body are cleaned. After that, the socket body moves forward toward the plug side so as to cause the valve body of the plug distal end to come into contact with the valve body of the socket body distal end, and at the same time the respective valve bodies are mutually retracted to thereby form a channel and transfer the fluid.

CITATION LIST

Patent Literature

[PTL 1]

The Publication of Japanese Patent No. 5046958.

SUMMARY

Technical Problem

According to the above-described document, as shown in FIG. 1 in the same document, a cleaning chamber 25*a* is cleaned before connecting the plug and the socket and forming the channel. More specifically, the cleaning liquid is injected into the cleaning chamber 25*a* through an injection port 46 opened on the inner peripheral surface of the cleaning chamber 25*a* and the cleaning liquid is exhausted from an exhaust hole 50.

However, the injection port 46 shown in the document is located closer to the socket than a sealing portion 47 that seals the plug. Therefore, after the plug and the socket are connected to form the channel, if the cleaning liquid is led into the cleaning chamber 25*a* from the injection port 46 due to some trouble, a problem occurs that the cleaning liquid is mixed into the liquid chemical (fluid), contaminating the liquid chemical.

The present disclosure has been implemented in view of the above-described circumstances, and it is an object of the present disclosure to provide a fluid transfer connector capable of preventing a cleaning liquid from being mixed into a fluid.

Solution to Problem

A liquid transfer connector according to an aspect of the present disclosure is provided with a plug having a plug body in which a fluid channel is formed, a socket having a socket body in which a fluid channel communicating with the fluid channel is formed when the plug is connected, a plug body housing part provided in the socket body, that receives and houses a distal end of the plug body inserted therein at a time of connection, a sealing member provided in the plug body housing part, that seals an outer periphery of the plug body inserted in the socket body, and a cleaning liquid supply hole that supplies a cleaning liquid into the plug body housing part at a position opposite to the distal end of the plug body with respect to the sealing member.

When the plug and the socket are connected together, the fluid channel is thereby formed and the fluid circulates via the fluid transfer connector. At this time, the outer periphery of the plug is sealed with the sealing member provided in the plug body housing part to thereby prevent leakage of the fluid.

The plug body and the socket body are cleaned by supplying the cleaning liquid into the plug body housing part through the cleaning liquid supply hole.

Since the cleaning liquid supply hole is provided at a position opposite to the distal end portion of the plug body with respect to the sealing member, even when the plug body and the socket body are connected together to transfer the fluid, even if the cleaning liquid leaks from the cleaning liquid supply hole due to some trouble, since it is separated from the distal end of the plug body via the sealing member, it is possible to prevent the cleaning liquid from being led to the distal end side of the plug body and being mixed into the fluid.

According to the liquid transfer connector according to another aspect of the present disclosure, the cleaning liquid supply hole is provided to be inclined toward the distal end side of the plug body.

Since the cleaning liquid supply hole is provided to be inclined toward the distal end side of the plug body, the cleaning liquid injected from the cleaning liquid supply hole flows toward the distal end side of the plug body. This makes it possible to lead the cleaning liquid to the distal end side of the plug body during cleaning and perform cleaning more effectively.

The liquid transfer connector according to a further aspect of the present disclosure is further provided with a gas supply hole that supplies a gas into the plug body housing part in addition to the cleaning liquid supply hole.

Since the gas supply hole for supplying a gas is further provided in the plug body housing part in addition to the cleaning liquid supply hole, it is possible to inject gas from a position different from the position where the cleaning liquid is supplied. This makes it possible to more effectively purge the interior of the plug body housing part.

According to the liquid transfer connector according to a still further aspect of the present disclosure, the gas supply hole is provided at a position on the distal end side of the plug body with respect to the sealing member.

The gas supply hole is provided on the distal end side of the plug body with respect to the sealing member. In this way, the gas supply hole and the cleaning liquid supply hole can be distributed and provided on both sides of the sealing member, which allows effective arrangement even in a narrow space.

Advantageous Effects

Since the cleaning liquid supply hole is provided at a position opposite to the distal end portion of the plug body, it is possible to prevent the cleaning liquid from being mixed into the fluid being transferred.

BRIEF DESCRIPTION OF DRAWINGS

FIG. 3B is a longitudinal cross-sectional view illustrating a first forward position of the cylinder.

FIG. 6 is a perspective view illustrating a key plate of the plug which has been turned.

FIG. 11 is a perspective view illustrating insertion of a distal end of the plug into an insertion port of the socket.

DESCRIPTION OF EMBODIMENTS

An embodiment of the present disclosure will be described below with reference to the drawings.

Figure 1:
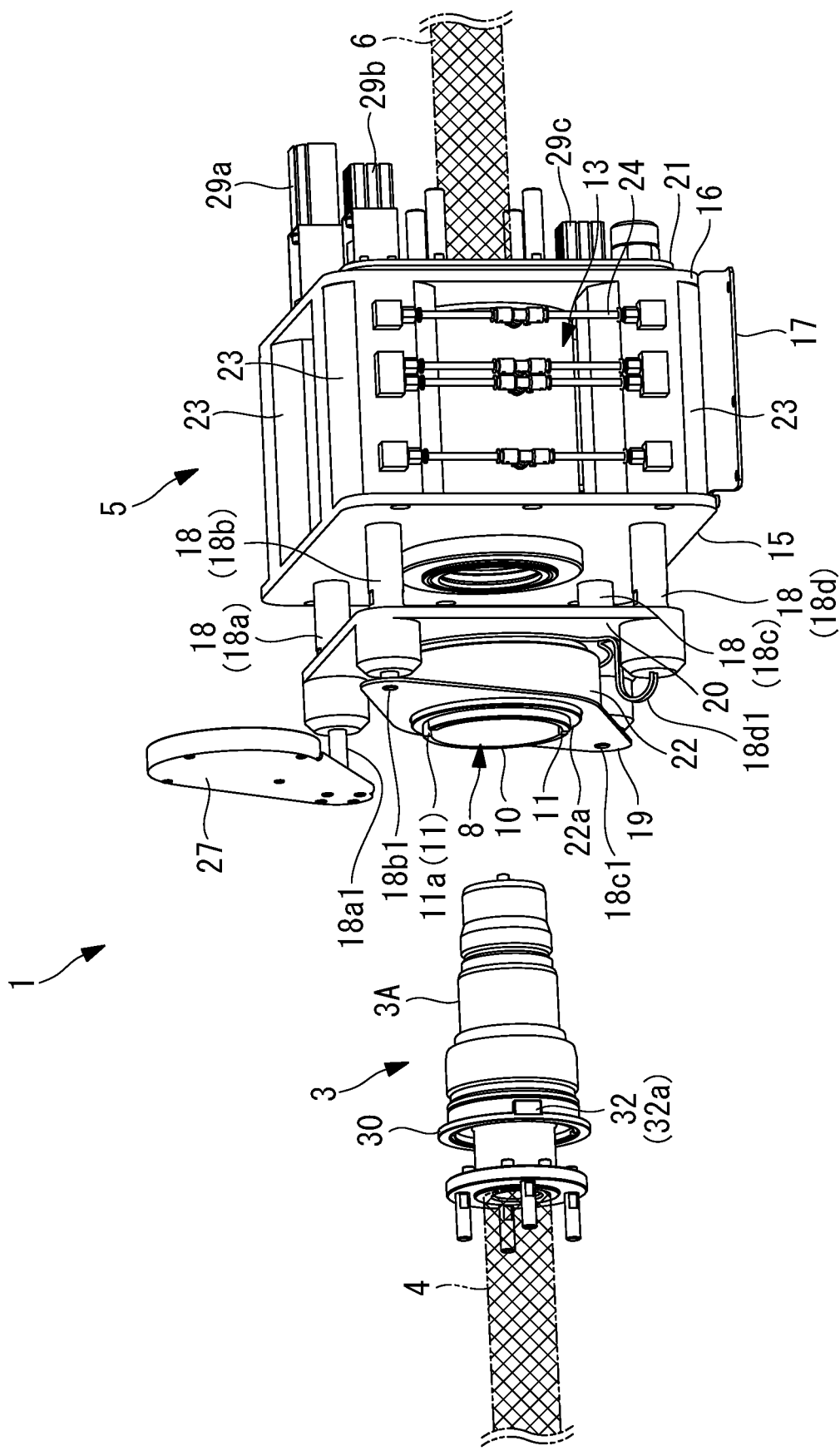
FIG. 1 is a perspective view of a fluid transfer connector according to an embodiment of the present disclosure.

FIG. 1 depicts a plug 3 and a socket 5 according to the present embodiment. The plug 3 and the socket 5 are used as a fluid transfer connector 1. Examples of fluids used herein include liquid chemicals and gas for use in semiconductor manufacturing apparatuses.

The socket 5 is fixed on a wall of a building, and one end of a pipe 6 is connected to a rear end of the socket 5. The other end of the pipe 6 is connected to a buffer tank (not shown in the figure) installed inside the building. The socket 5 includes an insertion port 8 at its front end (left end in FIG. 1) to allow for insertion of the plug 3. The insertion port 8 is formed inside a cylindrical insertion cylinder (plug body holding part) 10. At a distal end of the insertion cylinder 10, there are multiple key grooves 11 formed by cutting out a part of the insertion cylinder 10. The key grooves 11 are arranged at predetermined intervals in a circumferential direction of the insertion cylinder 10. A key groove 11 located at a vertically upper position serves as a main key groove 11a, having a larger circumferential width than that of the other key grooves 11.

The insertion cylinder 10 holds multiple lock balls 9 (see FIG. 5A etc.) spaced from each other in the circumferential direction. The lock balls 9 are used to fix the plug 3 to the socket 5.

Located at a rear side (right side in FIG. 1) of the insertion cylinder 10 is a socket body 13. The socket body 13 has a cylindrical shape with a horizontal central axis and includes therein a valve body 13a (see FIG. 5A etc.) for opening and closing a channel. A front fixing plate 15 and a rear fixing plate 16 are fixed to front and rear sides, respectively, of the socket body 13. The fixing plates 15, 16 are rectangular, vertically upright plates. Legs 17 are disposed below the fixing plates 15, 16 to fix the socket body 13 onto an installation surface. Four support shaft bodies 18 are extending in a horizontal direction so as to penetrate four corners of each of the fixing plates 15, 16.

Front and rear ends of each support shaft body 18 is fixed to a front support plate 20 and a rear support plate 21, respectively. The support plates 20, 21 are rectangular, vertically upright plates. The front support plate 20 supports the aforementioned insertion cylinder 10.

Each support shaft body 18 is mounted with a cylinder 23. Each cylinder 23 is fixed between the front fixing plate 15 and the rear fixing plate 16. An air supply pipe 24 is connected to each cylinder 23, and air pressure supplied from the air supply pipe 24 causes the corresponding support shaft body 18 to reciprocate in the axial direction relative to the cylinder 23. This in turn causes the insertion cylinder 10, which is supported by the front support plate 20, to move closer to or away from the socket body 13.

Figure 2:
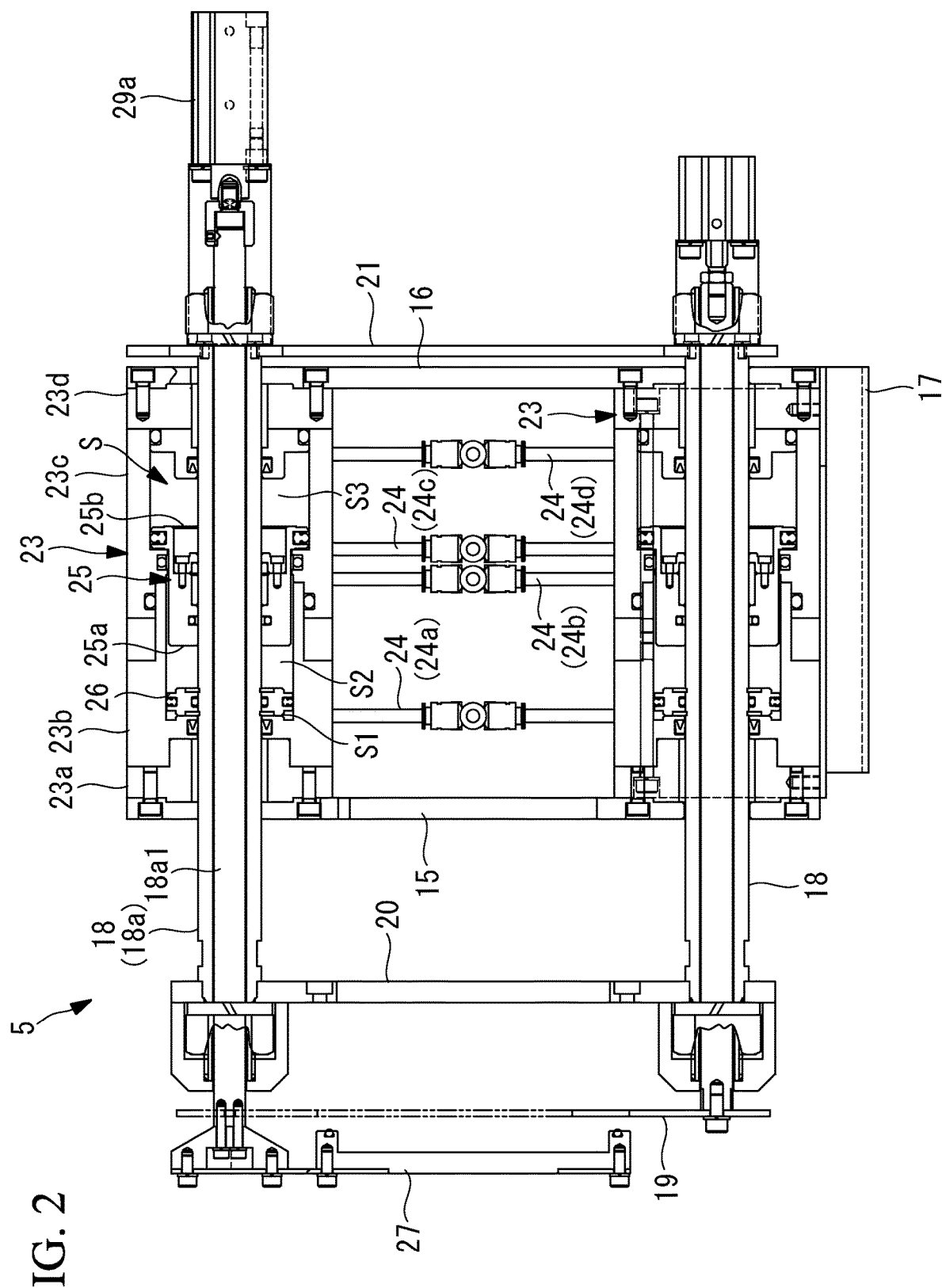
FIG. 2 is a longitudinal cross-sectional view illustrating a socket.

A lid 27 is attached to a first support shaft body 18a, which is one of the two upper support shaft bodies 18. Specifically, as shown in FIG. 2, a lid driving shaft body 18a1 axially penetrates the inside of the first support shaft body 18a. FIG. 2 is a longitudinal-sectional view taken along a longitudinal plane of the first support shaft body 18a, depicting the socket 5 with the socket body 13 removed.

The cylinder 23 includes a first cylinder part 23a, a second cylinder part 23b, a third cylinder part 23c, and a fourth cylinder part 23d in this order from the front fixing plate 15 to the rear fixing plate 16. The cylinder parts 23a, 23b, 23c, and 23d share the same axis and are connected in series and liquid-tight by O-rings.

Inside the inner peripheries of the second cylinder part 23b and the third cylinder part 23c, there is a sealed space S. Air is supplied to, and discharged from, the sealed space S through the air supply pipes 24. Disposed within the sealed space S is a piston 25. The piston 25 is fitted air-tight to the inner periphery of the third cylinder part 23c and the outer periphery of the lid driving shaft body 18a1, and axially reciprocates within the sealed space S.

A partition ring 26 partitioning the sealed space S is provided on the front side (left side in FIG. 2) of the piston 25. The partition ring 26 is fixed to the first support shaft body 18a and fitted air-tight to the inner periphery of the second cylinder part 23b. The partition ring 26 thus partitions the sealed space S into a first space S1 on the front side (left side) of the partition ring 26 and a second space S2 on the rear side (right side) of the partition ring 26. FIG. 2 shows the state where the partition ring 26 is at the frontmost (leftmost) position, and the volume of the first space S1 is almost zero. On the rear side (right side) of the piston 25, there is a third space S3. As such, the sealed space S is partitioned by the partition ring 26 and the piston 25 into the first space S1, the second space S2, and the third space S3.

The piston 25 includes a small-diameter part 25a on the front side and a large-diameter part 25b on the rear side. The area of the front end face of the piston 25 is thus smaller than the cross-sectional area of the rear end face of the piston 25. This results in the rear end face receiving a larger force than the front end face in response to air of the same pressure being supplied to the second space S2 and the third space S3, which in turn causes the piston 25 to be displaced toward the front side (left side) within the sealed space S.

The air supply pipes 24 include a first pipe 24a, a second pipe 24b, a third pipe 24c, and a fourth pipe 24d in this order from the front side to the rear side. The first pipe 24a supplies and discharges air to and from the first space S1. The second pipe 24b supplies and discharges air to and from a small-diameter portion of the second space S2 where the small-diameter part 25a of the piston 25 reciprocates. The third pipe 24c supplies and discharges air to and from a large-diameter portion of the second space S2 where the large-diameter part 25b of the piston 25 reciprocates. The fourth pipe 24d supplies and discharges air to and from the third space S3. The timings at which air is supplied to and discharged from each of the pipes 24a, 24b, 24c, and 24d are controlled by the controller.

The cylinder 23, the piston 25, and the partition ring 26 described above constitute the driving mechanism to adjust a distance between the plug body 3A and the socket body 13.

The other support shaft bodies of the second support shaft body 18b, the third support shaft body 18c, and the fourth support shaft body 18d each include the cylinder 23, the piston 25, and the partition ring 26 that are similar to those in the first support shaft body 18a. The air supply pipes 24 connected to each of the four cylinders 23 have the same length and diameter. This enables accurately synchronized driving of the pistons 25 provided in the respective four cylinders 23.

Figure 3A:
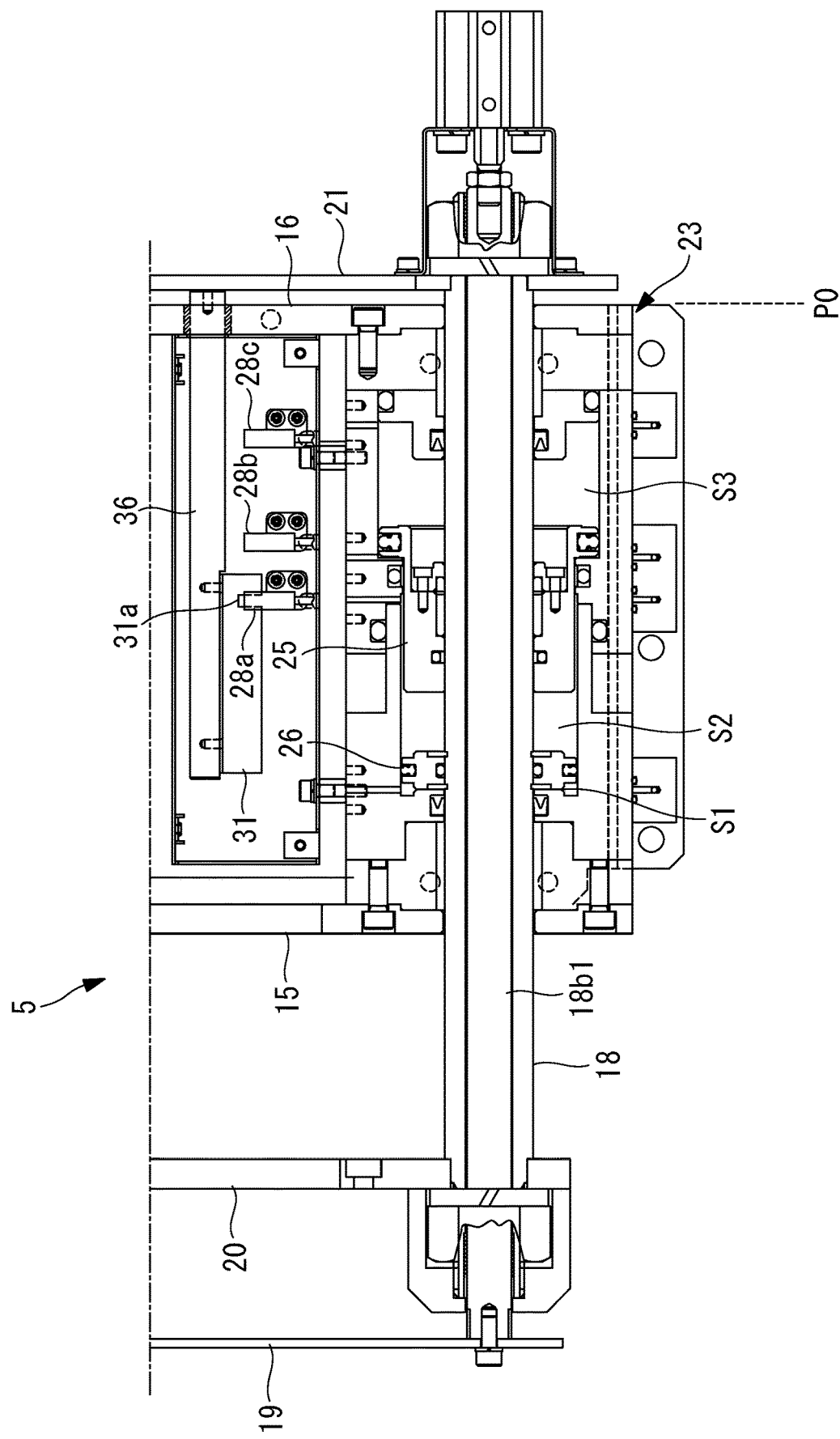
FIG. 3A is a longitudinal cross-sectional view illustrating an initial position of a cylinder.
Figure 3C:
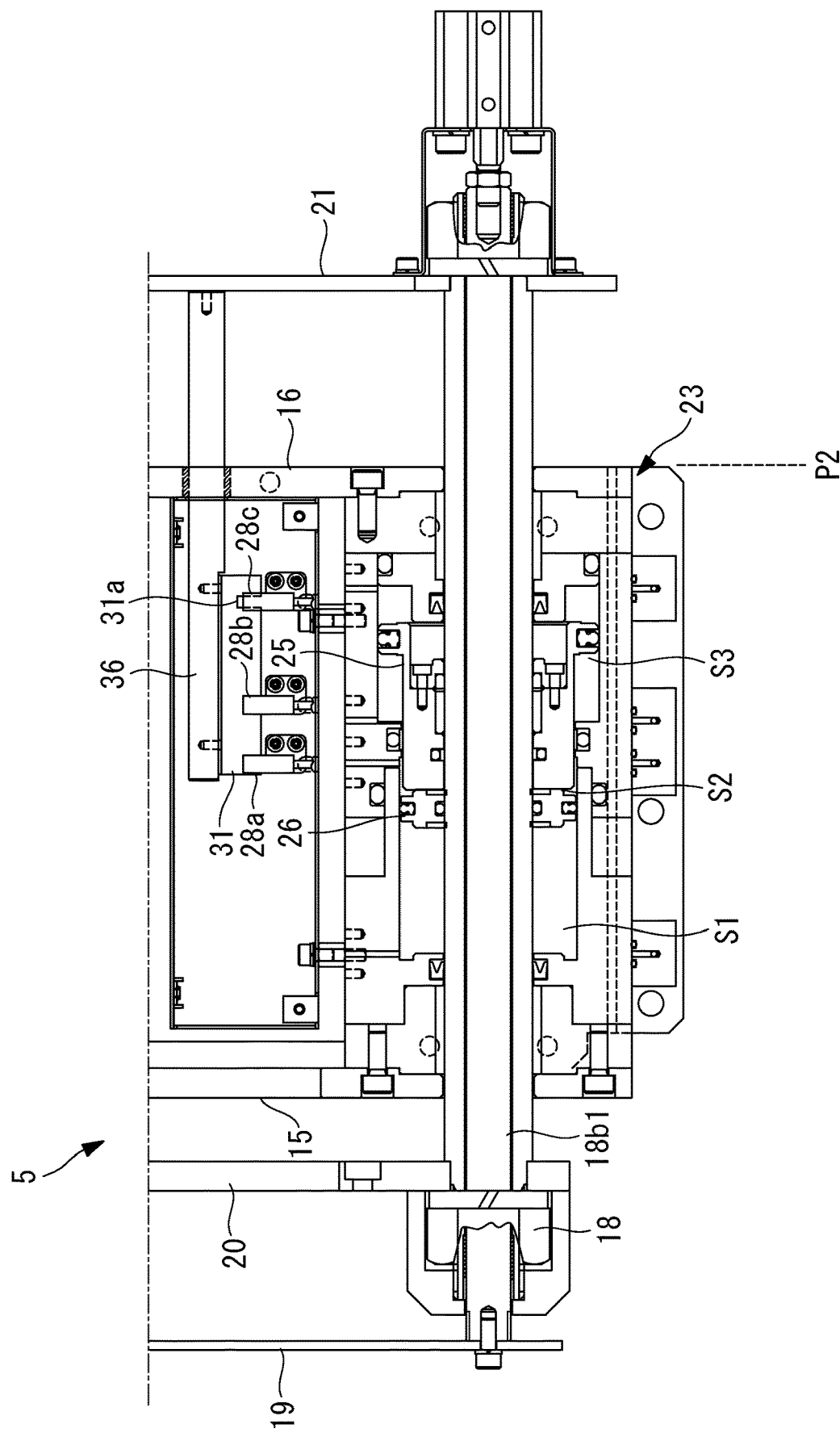
FIG. 3C is a longitudinal cross-sectional view illustrating a second forward position of the cylinder.

FIGS. 3A to 3C illustrate movement of the cylinder 23 in response to air being supplied to and discharged from the air supply pipes 24. FIG. 3A depicts an initial position PO where the cylinder 23 is at its closest to the rear support plate 21, namely where the socket body 13 is at its farthest from the plug body 3A. FIG. 3B depicts a first forward position P1 that is an intermediate position where the cylinder 23 is advanced from the initial position PO toward the front support plate 20. FIG. 3C depicts a second forward position P2 where the cylinder 23 is at its closest to the front support plate 20, namely where the plug body 3A is connected to the socket body 13.

As shown in FIGS. 3A to 3C, a first position sensor 28a, a second position sensor 28b, and a third position sensor 28c are fixed to the cylinder 23 in this order from the front side (left side in the figures) to the rear side (right side in the figures). Each of the position sensors 28a, 28b, and 28c is composed of a pair of a light-emitting element (e.g., an LED) and a light-receiving element. Outputs from the position sensors 28a, 28b, and 28c are transmitted to the controller.

Each of the position sensors 28a, 28b, and 28c has a U-section, and a sensor plate 31 passes through the space encompassed by the U-shape of each sensor. The sensor plate 31 is fixed to a rod 36 fixed to the rear support plate 21. The position sensors 28a, 28b, and 28c optically detect a notch 31a of the sensor plate 31 when the sensor plate 31 passes through the space encompassed by the U-shape of each sensor. This allows to detect a position of the cylinder 23 relative to the rear support plate 21, to which the sensor plate 31 is fixed. In other words, the position sensors 28a, 28b, and 28c detect a position of the socket body 13 relative to the plug 3.

At the initial position PO shown in FIG. 3A, air is supplied through the fourth pipe 24d (see FIG. 2) of the air supply pipes 24 to the third space S3 and pressurizes the third space S3, and this pushes the piston 25 to the left side in the figure. Air is also supplied through the second pipe 24b (see FIG. 2) to the second space S2 and pressurizes the second space S2, and this pushes the partition ring 26 to the left side in the figure. Because of the area ratio between the large-diameter part 25b and the small-diameter-part 25a of the piston 25, the piston 25 continues to be pushed to the left side despite the air of the same pressure being supplied to the second space S2 and the third space S3.

At this time, the notch 31a of the sensor plate 31 is positioned at the first position sensor 28a. The controller thus determines that the cylinder 23 is at the initial position P0.

At the first forward position P1 shown in FIG. 3B, air is discharged from the second space S2 through the second pipe 24b (see FIG. 2), and air is also supplied through the first pipe 24a (see FIG. 2) to the first space S1 and pressurizes the first space Sl. This pushes the partition ring 26 to the right side. Further, air is supplied through the fourth pipe 24d (see FIG. 2) to the third space S3 and pressurizes the third space S3. This displaces the support shaft body 18, along with the partition ring 26, to the right side relative to the cylinder 23.

At this time, the notch 31a of the sensor plate 31 is positioned at the second position sensor 28b. The controller thus determines that the cylinder 23 is at the first forward position P1.

At the second forward position P2 shown in FIG. 3C, air is discharged from the third space S3 through the fourth pipe 24d (see FIG. 2), and air is also supplied to the first space S1 through the first pipe 24a (see FIG. 2) and pressurizes the first space S1, and air is also supplied through the third pipe 24c (see FIG. 2). The piston 25 and the partition ring 26 are thereby pushed to the right side. This displaces the support shaft body 18, along with the partition ring 26, further to the right side relative to the cylinder 23.

At this time, the notch 31a of the sensor plate 31 is positioned at the third position sensor 28c. The controller thus determines that the cylinder 23 is at the second forward position P2.

As shown in FIG. 2, the lid 27 is fixed to a front end of the lid driving shaft body 18a1. The lid driving shaft body 18a1 is reciprocated in forward and backward directions (the axial direction) and rotated around the axis by a first actuator 29a provided at a rear end of the first support shaft body 18a. Operation of the first actuator 29a is controlled by a controller (not shown in the figure).

Figure 4:
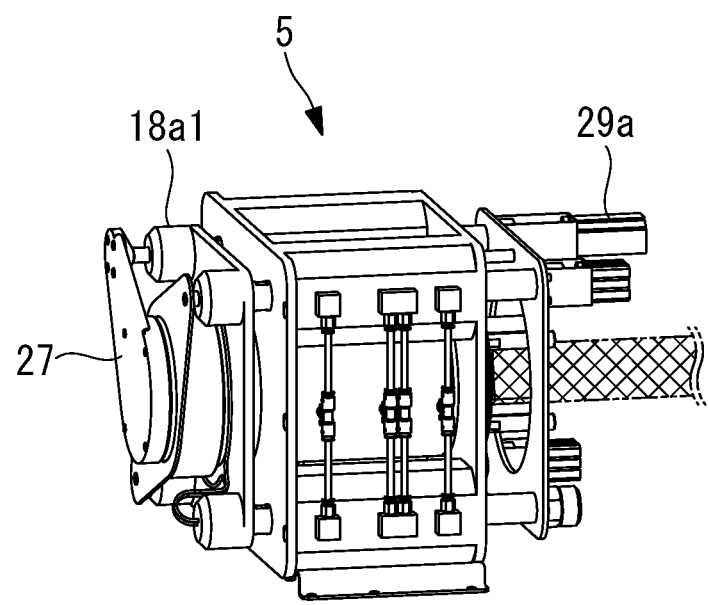
FIG. 4 is a perspective view of a socket when its lid is closed.

The lid 27 is used to close the insertion port 8 when the fluid transfer connector 1 is not in use and the plug 3 is removed from the socket 5. FIG. 4 illustrates the lid 27 when it is closed. Closing the insertion port 8 with the lid 27 allows to prevent contamination of the fluid. Additionally, closing the insertion port 8 with the lid 27 during non-use of the fluid transfer connector 1 allows to prevent contamination of the channel between the lid 27 and the valve body inside the socket body 13.

As shown in FIG. 1, a sleeve driving plate 19 is attached to a second support shaft body 18*b*, which is the other of the two upper support shaft bodies 18, and a third support shaft body 18*c*, which is located diagonally to the second support shaft body 18*b* across the insertion cylinder 10. Specifically, the sleeve driving plate 19 is fixed to front ends of a sleeve driving plate shaft body 18*b*1 penetrating the second support shaft body 18*b* along the central axis and a sleeve driving plate shaft body 18*c*1 penetrating the third support shaft body 18*c* along the central axis. The sleeve driving plate shaft bodies 18*b*1, 18*c*1 are reciprocated in forward and backward directions (the axial direction) by a second actuator 29*b* and a third actuator 29*c*, respectively, provided at the respective rear ends of the support shaft bodies 18*b*, 18*c*. Operation of the actuators 29*b*, 29*c* is controlled by the controller (not shown in the figure).

Figure 5A:
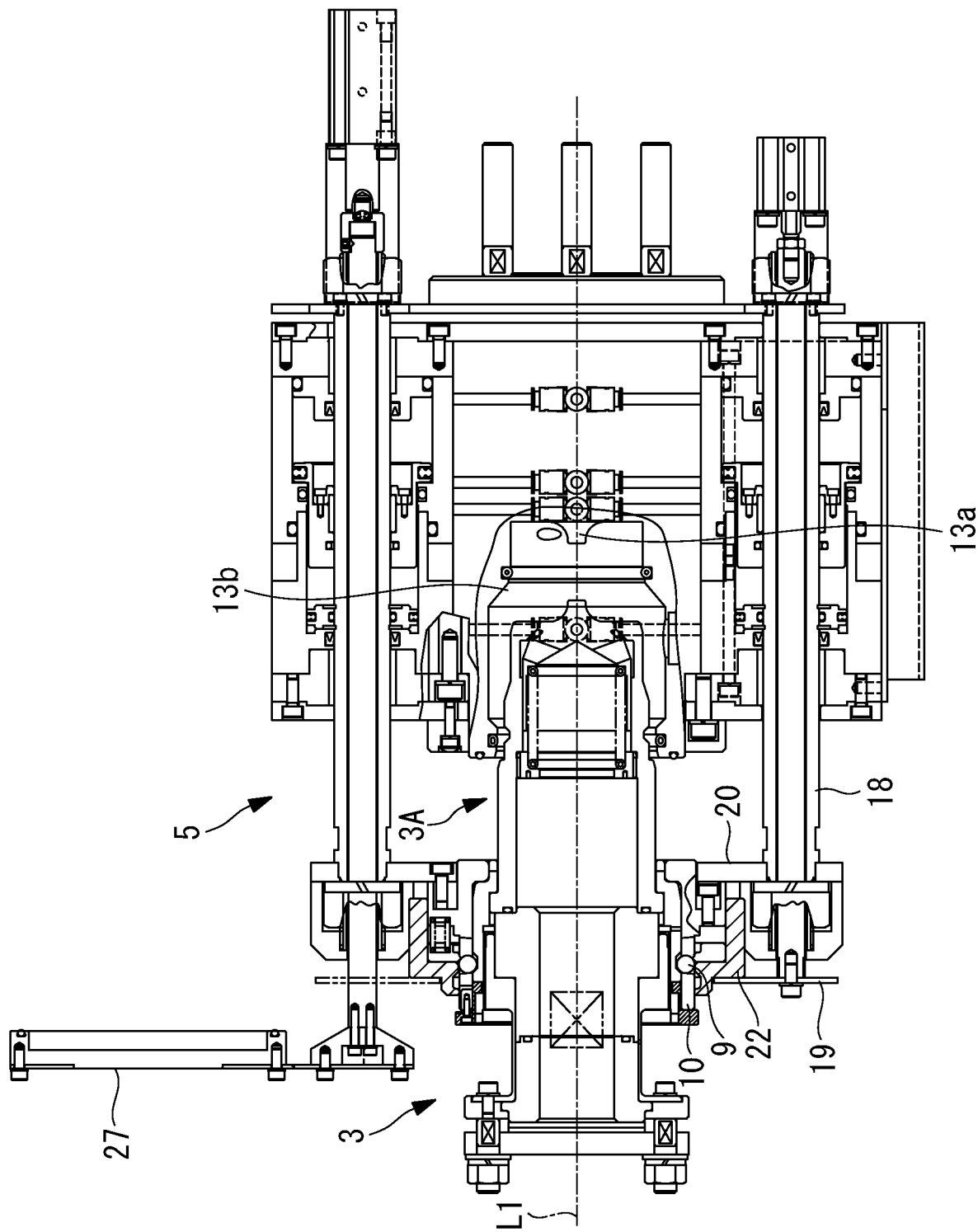
FIG. 5A is a longitudinal-sectional view illustrating a state where a sleeve restricts movement of lock balls.
Figure 5B:
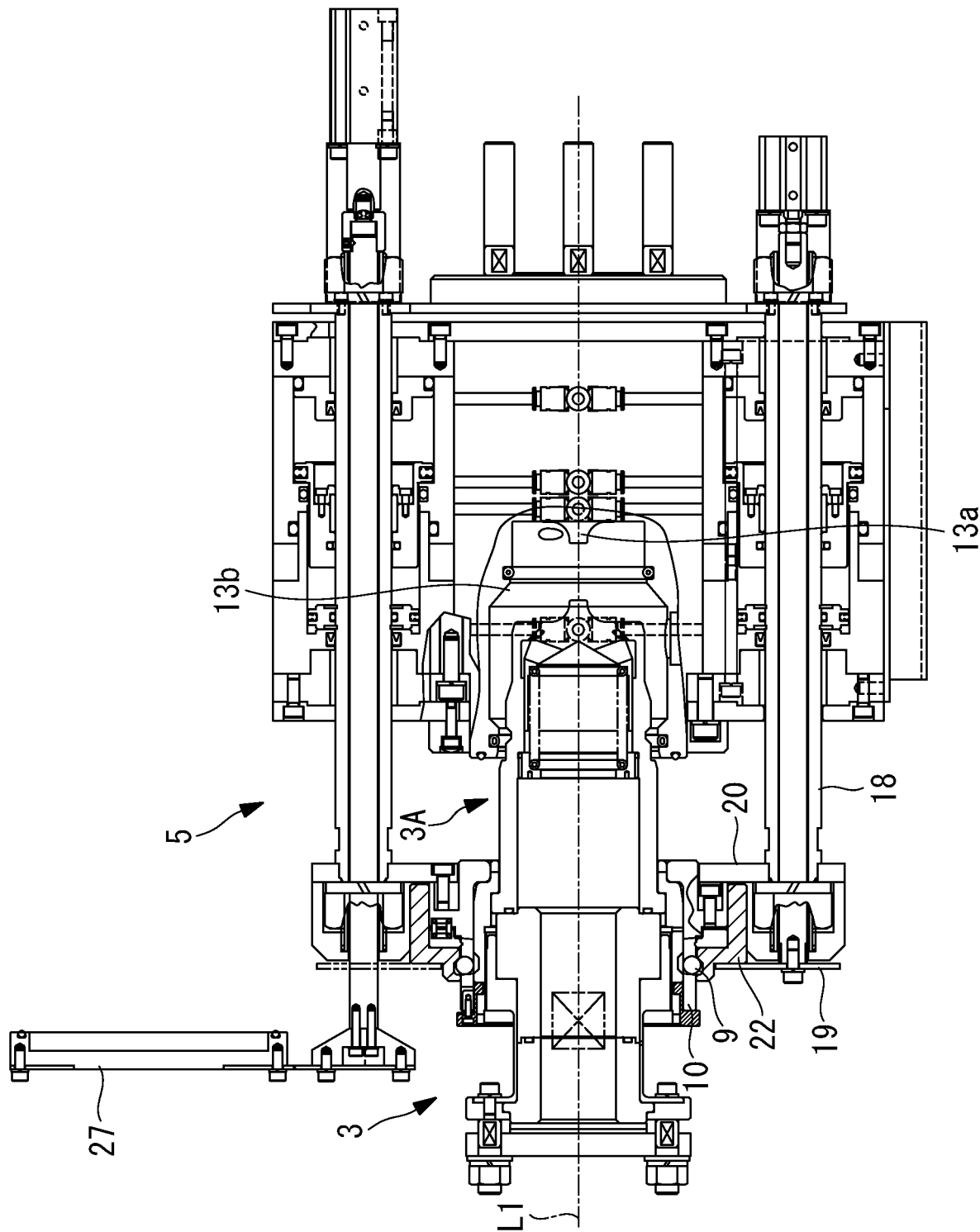
FIG. 5B is a longitudinal-sectional view illustrating a state where the sleeve permits movement of the lock balls.

The sleeve driving plate 19 is a substantially diamond-shaped plate having an opening at the center thereof. The opening of the sleeve driving plate 19 allows for insertion of a distal end 22*a* of a cylindrical sleeve 22. As shown in the lower part of FIG. 7, the sleeve 22 is positioned to cover an outer periphery of the insertion cylinder 10 and reciprocates in the axial direction relative to the insertion cylinder 10. The sleeve driving plate 19 is operative to displace the sleeve 22 when the plug 3 is unfixed and removed from the socket 5. Specifically, the sleeve 22 restricts the lock balls 9 from moving radially outward as shown in FIG. 5A. Then, as shown in FIG. 5B, the sleeve driving plate 19 is drawn toward the front support plate 20 (to the right side in FIG. 5B) to displace the sleeve 22. This permits the lock balls 9 to move radially outward and unlocks the plug 3. To fix the plug 3 to the socket 5, the lock balls 9 are rolled into, and engaged with, a recess 39*a* of a first fixing ring 39 as the plug 3 is inserted into the insertion cylinder 10. At this time, the sleeve driving plate 19 is not operative. The lock balls 9, the sleeve 22 and other relevant elements thus constitute a locking mechanism that locks the plug 3 to the insertion cylinder 10, namely the socket 5.

As shown in FIG. 1, a fourth support shaft body 18*d* is disposed below the second support shaft body 18*b* and laterally to the third support shaft body 18*c*. A sensor wire 18*d*1 is connected from the inside of the fourth support shaft body 18*d* to the inside of the sleeve 22. At a distal end of the sensor wire 18*d*1, there is a sensor (not shown in the figure) composed of a pair of a light-emitting element (e.g., an LED) and a light-receiving element. The sensor detects whether the plug 3 is inserted into an appropriate position within the insertion cylinder 10. Outputs from the sensor are transmitted to the controller (not shown in the figure) through the sensor wire 18*d*1.

The controller may be composed of, for example, a central processing unit (CPU), a random-access memory (RAM), a read only memory (ROM), and a computer-readable storage medium. For example, a set of processes to provide various functions is stored in the storage medium or other equivalents in the form of a program. The CPU loads this program onto the RAM or other memories to execute information processing and calculations, whereby various functions are provided. The program may be pre-installed on the ROM or other storage media, may be provided in a computer-readable storage medium, or may be provided via wired or wireless communication means. Examples of the computer-readable storage medium include a magnetic disk, a magneto-optical disk, a CD-ROM, a DVD-ROM, and a semiconductor memory.

As shown in FIG. 1, the plug 3 is substantially cylindrical and includes a channel inside thereof to permit the flow of fluid. One end of a hose 4 is connected to a proximal end (the left side in FIG. 1) of the plug 3. The other end of the hose 4 is fixed to a tanker truck (not shown in the figure). The hose 4 has an inner diameter of 25 mm or more, preferably 50 mm or more.

A key plate (ring body) 30 is attached to a rear part of the plug 3. The key plate 30 is in the form of an endless ring. At multiple locations on the circumference of the key plate 30, there are keys 32 protruding to the distal end side (the right side in FIG. 1). One of the multiple keys 32 is a main key 32*a* having a larger circumferential width than that of the other keys 32. The key plate 30 is revolvable around the axis relative to a plug body 3A. This allows workers to manually rotate the key plate 30 to position the main key 32*a* at a vertically upper position, which is a desired position, as shown in FIG. 6.

Figure 7:
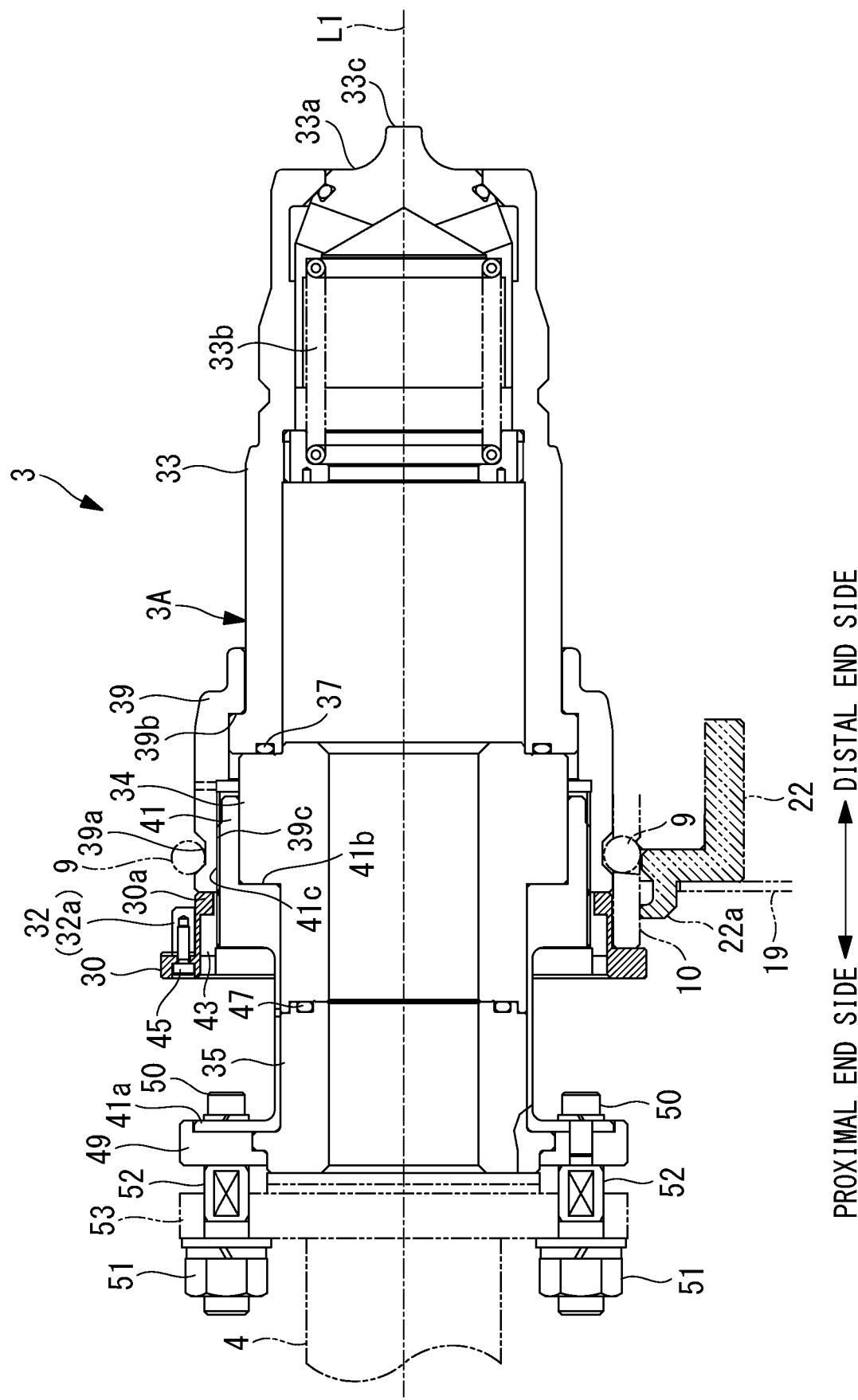
FIG. 7 is a longitudinal cross-sectional view of the plug.

FIG. 7 is a longitudinal-sectional view of the plug 3. The lower part of FIG. 7 depicts the lock ball 9, the insertion cylinder 10, the sleeve 22 and the sleeve driving plate 19, which are components of the socket 5.

The plug body 3A includes a distal cylinder 33, an intermediate cylinder 34, and a proximal cylinder 35 in this order from its distal end (the right side in FIG. 7). These cylinders 33, 34 and 35 are connected along the same plug central axis L1, forming a channel inside of them to permit the flow of fluid.

A valve body 33*a* is contained in the distal cylinder 33. The valve body 33*a* is pushed by a spring 33*b* toward a distal end side of the distal cylinder 33. This causes the valve body 33*a* to close a distal opening of the distal cylinder 33. The valve body 33*a* is provided with a protrusion 33*c* at the center of the distal end thereof. The protrusion 33*c* protrudes toward the distal end side along the plug central axis L1. When the plug 3 is connected to the socket 5, the protrusion 33*c* abuts against an opposing protrusion (not shown in the figure) of the valve body of the socket 5. This abutment of the protrusion 33*c* of the plug 3 against the protrusion of the valve body of the socket 5 causes the valve body 33*a* to overcome the pressing force of the spring 33*b* and retract toward the proximate end side, which results in the channel inside the plug 3 being opened.

A proximal end (left side) of the distal cylinder 33 and a distal end of the intermediate cylinder 34 are faced to each other and connected in a fitting-in manner. An O-ring 37 is disposed between the distal cylinder 33 and the intermediate cylinder 34 to seal them liquid-tight or air-tight.

A first fixing ring 39 covers an outer periphery of the proximal end of the distal cylinder 33. The first fixing ring 39 includes the circumferential recess 39*a* along its outer periphery. When the plug 3 is connected to the socket 5, the lock balls 9 held by the insertion cylinder 10 are moved by the sleeve 22 radially inward to fit into the recess 39*a*. By engagement of the lock balls 9 into the recess 39*a*, the plug 3 is fixed to the socket 5. The first fixing ring 39 includes a stepped shoulder 39*b* on its inner periphery. The shoulder 39*b* is engaged with a large-diameter part at the proximal end of the distal cylinder 33. The first fixing ring 39 includes a female threaded part 39*c* on its proximal inner periphery.

A second fixing ring 41 almost entirely covers an outer periphery of the intermediate cylinder 34. The second fixing ring 41 includes a stepped shoulder 41b on its inner periphery. The shoulder 41b is engaged with a large-diameter part at a distal end of the intermediate cylinder 34. The second fixing ring 41 includes a male threaded part 41c on its distal outer periphery. Screwing the male threaded part 41c of the second fixing ring 41 into the female threaded part 39c of the first fixing ring 39 fixes the distal cylinder 33 and the intermediate cylinder 34 with each other.

The male threaded part 41c of the second fixing ring 41 is screwed with a lock nut 43 from the proximal end side. The lock nut 43 is fixed at a position abutting against the proximal end of the first fixing ring 39. The lock nut 43 is positioned within the inner periphery of the key plate 30. A proximal end of the lock nut 43 is located on the distal end side relative to a proximal end of the key plate 30. This results in the lock nut 43 being accommodated in the key plate 30, so that the lock nut 43 does not protrude from the proximal end of the key plate 30.

The distal outer periphery of the lock nut 43 is smaller in diameter than its proximal outer periphery. This forms a groove between the lock nut 43 and the proximal end of the first fixing ring 39, and an inward-protruding, small-diameter part 30a at the distal end of the key plate 30 is inserted into the groove. The length of the small-diameter part 30a in the plug central axis L1 direction is smaller than that of the groove into which the small-diameter part 30a is inserted. This loose-fitting of the small-diameter part 30a of the key plate 30 in the groove allows the key plate 30 to move freely in the revolution direction while regulating the position of the key plate 30 in the plug central axis L1 direction.

Each key 32 is fixed to the key plate 30 with a bolt 45. The bolt 45 is inserted into the key plate 30 and the key 32 from the proximal end side to the distal end side. Fixing with the bolt 45 is not the only method to fix the key 32; for example, the key plate 30 and the key 32 may be integrally formed.

A proximal end of the intermediate cylinder 34 and a distal end of the proximal cylinder 35 are faced to each other and connected in a fitting-in manner. An O-ring 47 is disposed between the intermediate cylinder 34 and the proximal cylinder 35 to seal them liquid-tight or air-tight.

A flange 41a of the second fixing ring 41 at its proximal end is fixed to a proximal flange 49 with bolts 50. The proximal flange 49 is engaged with a proximal outer periphery of the proximal cylinder 35 and fixed in this state. The bolts 50 are screwed into the proximal flange 49. This fixes the proximal cylinder 35 to the intermediate cylinder 34 and the distal cylinder 33.

Multiple fixing bolts 52 are fixed to a proximal end face of the proximal flange 49. Each fixing bolt 52 penetrates a hose fixing flange 53 for fixing the hose 4 and has its end engaged with a nut 51. This fixes the hose fixing flange 53 to the proximal flange 49, whereby the hose 4 is fixed to the plug 3.

Figure 8:
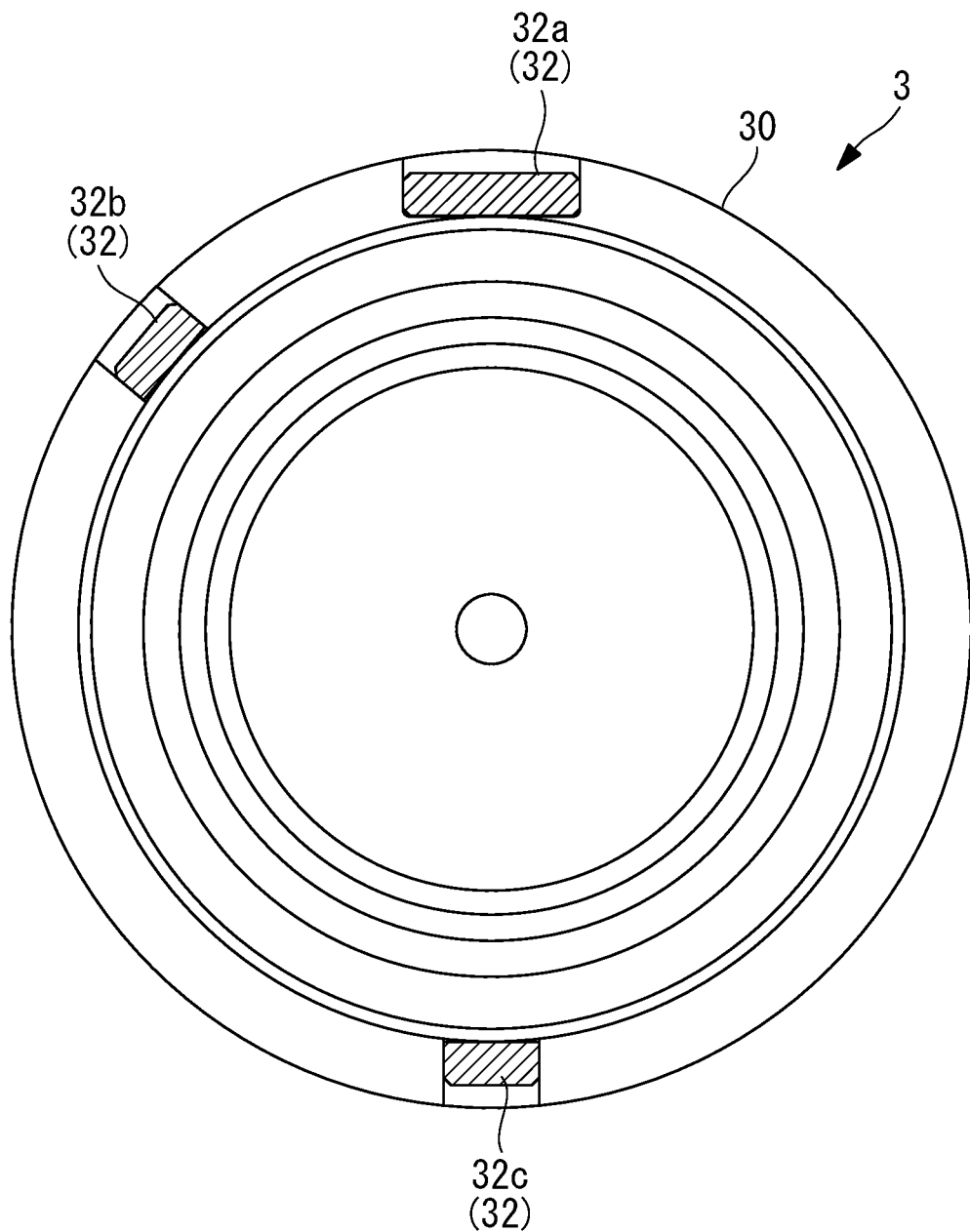
FIG. 8 is a front view illustrating a position of the key provided in the plug in FIG. 6.

FIG. 8 illustrates angle positions of the multiple keys 32 in the circumferential direction. The figure shows three keys 32. At the vertically upper position, namely at the twelve-o'clock position, the main key 32a is fixed to the key plate 30. FIG. 5 depicts the key plate 30 when it is revolved in the circumferential direction so as to situate the main key 32a at the twelve-o'clock position.

A first sub-key 32b is fixed to the key plate 30 at a position between the twelve-o'clock position and the nine-o'clock position. A second sub-key 32c is fixed to the key plate 30 at the six-o'clock position. The main key 32a has a circumferential width about twice as large as that of the first sub-key 32b and the second sub-key 32c. The first sub-key 32b and the second sub-key 32c have the same circumferential width, though they may have a different width.

As shown in FIG. 5A and FIG. 5B, the socket body 13 is provided with a plug body housing part 13b that houses the distal end side of the plug body 3A. The plug body housing part 13b is formed along a central axis which is common to a plug central axis L1, forming a space having a shape corresponding to the distal end portion of the plug body 3A.

Figure 9A:
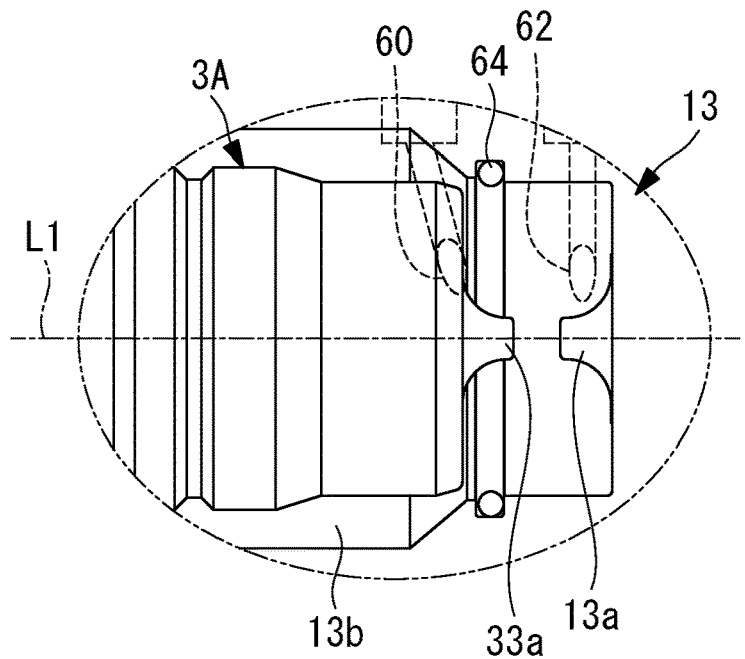
FIG. 9A is an enlarged longitudinal cross-sectional view around the plug body housing part at the first forward position.
Figure 9B:
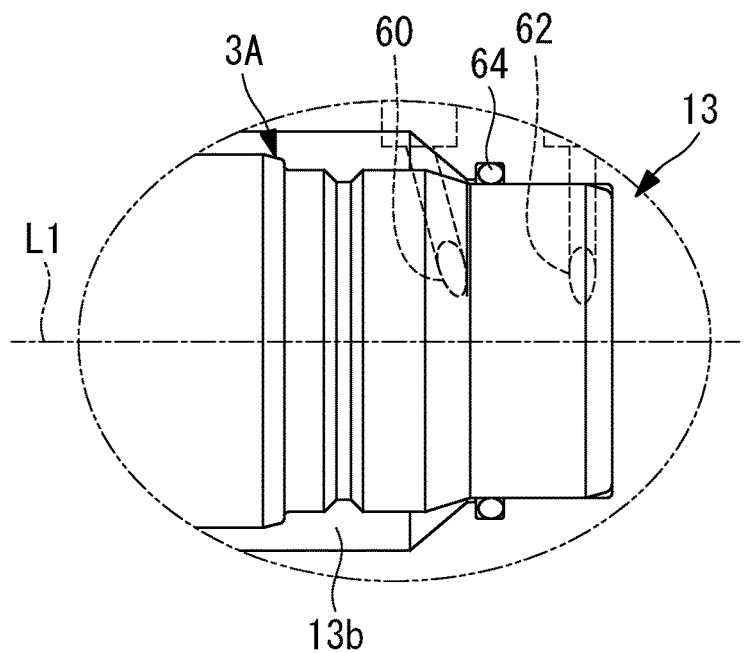
FIG. 9B is an enlarged longitudinal cross-sectional view around the plug body housing part at the second forward position.

FIG. 9A and FIG. 9B illustrate enlarged views around the plug body housing part 13b. The plug body housing part 13b of the socket body 13 is provided with a cleaning liquid supply hole 60 for supplying a cleaning liquid such as water into the plug body housing part 13b and a gas supply hole 62 for supplying a drying purge gas into the plug body housing part 13b. The cleaning liquid supply hole 60 is provided in a tangential direction along the inner peripheral surface of the plug body housing part 13b and inclined toward the distal end side of the plug body 3A so as to supply the cleaning liquid. The gas supply hole 62 is provided so as to supply gas in a tangential direction along the inner peripheral surface of the plug body housing part 13b.

A cleaning liquid valve is provided on an upstream side of the cleaning liquid supply hole 60 and supply timing is determined by a command of the control unit. A gas valve is provided on an upstream side of the gas supply hole 62 and supply timing is determined by a command of the control unit.

An O-ring (sealing member) 64 is provided between the cleaning liquid supply hole 60 and the gas supply hole 62. The O-ring 64 is inserted in a circumferential groove formed on an inner periphery of the plug body housing part 13b. Thus, the cleaning liquid supply hole 60 is provided at a position opposite to the distal end of the plug body 3A with respect to the O-ring 64 and the gas supply hole 62 is provided at a position on the distal end side of the plug body 3A with respect to the O-ring 64.

Note that although not shown, the plug body housing part 13b is provided with an exhaust channel that exhausts the cleaning liquid and gas at a position further on a proximal end side (left side in FIG. 9A and FIG. 9B) of the plug body 3A of the cleaning liquid supply hole 60.

Figure 10A:
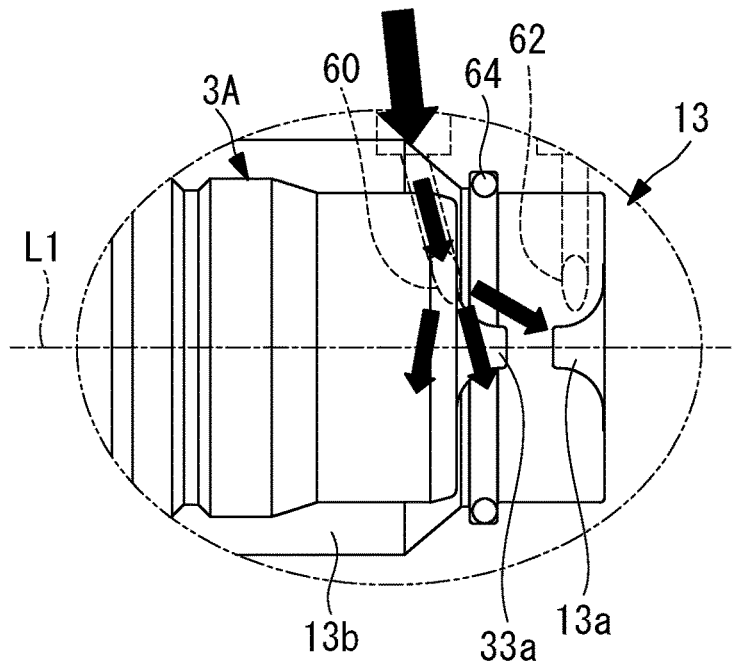
FIG. 10A is a longitudinal cross-sectional view illustrating a flow of the cleaning liquid with respect to FIG. 9A.

Cleaning is performed in the state shown in FIG. 9A, that is, the valve body 33a of the plug body 3A is separated from the valve body 13a of the socket body 13 (more specifically, the first forward position P1). FIG. 10A illustrates a state in which the cleaning liquid is injected from the cleaning liquid supply hole 60 during cleaning as indicated by arrows. The cleaning liquid flows while swirling along the inner peripheral surface of the plug body housing part 13b and flows toward the distal end side (right side in the drawing) of the plug body 3A. In this way, the distal end of the plug body 3A, the distal end of the valve body 13a of the socket body 13 and the interior of the plug body housing part 13b are cleaned.

The state shown in FIG. 9B illustrates a state in which the plug body 3A and the socket body 13 are brought closer to each other from the state in FIG. 9A, thus causing the channels of the plug 3 and the socket 5 to communicate with each other (more specifically, the second forward position P2). As is clear from the drawing, the distal end of the plug body 3A is fitted so as to fill the termination side (right side) of the plug body housing part 13b. Furthermore, the outer periphery of the plug body 3A is liquid-tightly sealed by the O-ring 64. Even if the cleaning liquid leaks from the cleaning liquid supply hole 60 in this state, the cleaning liquid supply hole 60 is sealed by the O-ring 64 as shown by arrows in FIG. 10B, which prevents the cleaning liquid from being led to the distal end side of the plug body 3A.

A description will now be given of operation to connect and disconnect the plug 3 to and from the socket 5.

Connection Preparation Step

As shown in FIG. 1, the plug 3 is first positioned to face the socket 5. Then, as shown in FIG. 6, the key plate 30 is manually rotated by a worker and positioned such that the main key 32a comes at a position easily visible by the worker from above, namely the vertically upper position.

Insertion Step

Figure 12:
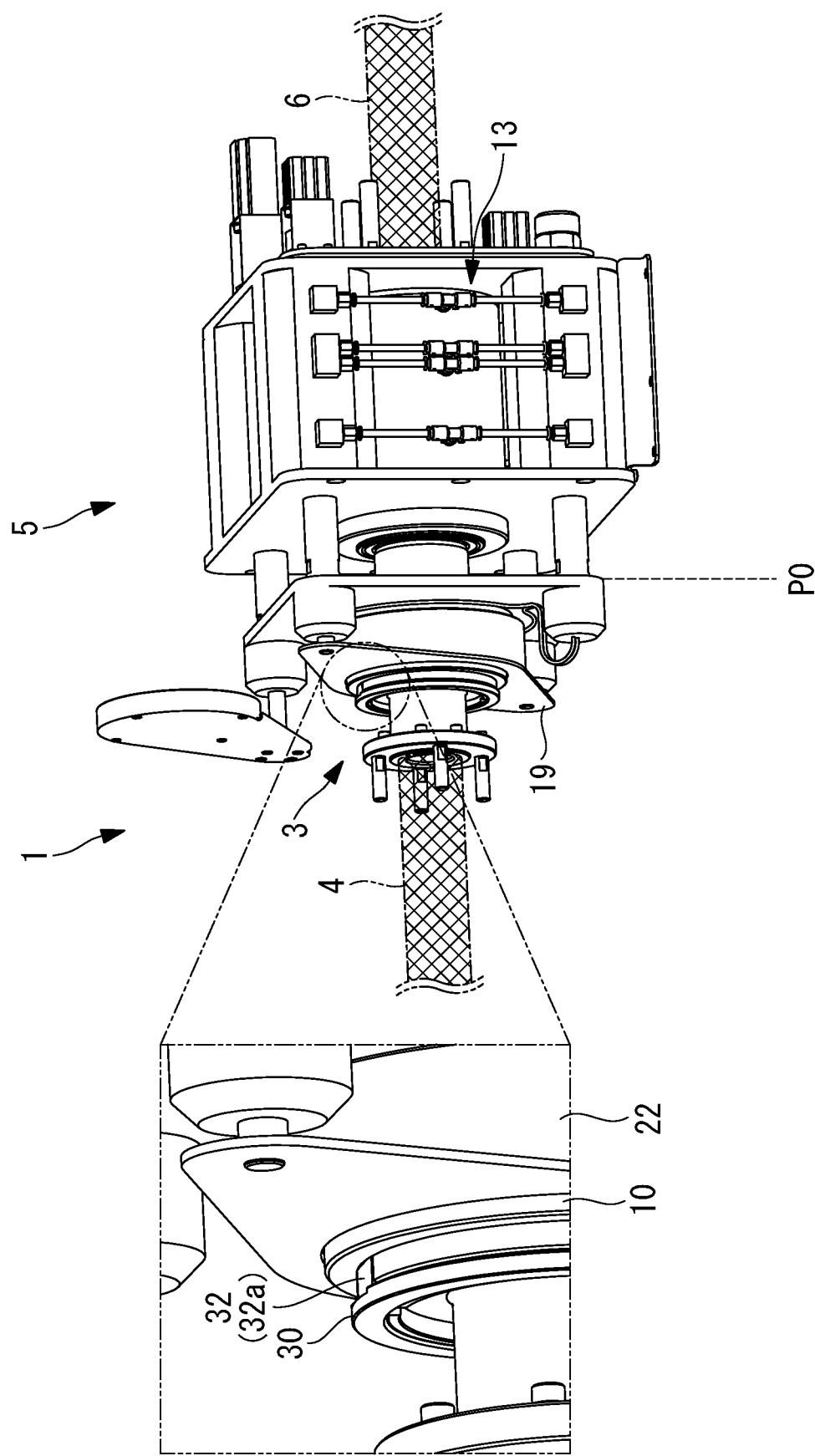
FIG. 12 is a perspective view illustrating engagement of the keys of the plug with key grooves of the socket.

After the key plate 30 is positioned, the distal end of the plug 3 is inserted into the insertion port 8 of the socket 5, as shown in FIG. 11. Inserting the plug 3 into the socket 5 further in the axial direction results in the keys 32 mating and engaging with the corresponding key grooves 11 on the insertion cylinder 10 of the socket 5, as shown in FIG. 12. The successful mating and engagement of the keys 32 with the key grooves 11 means that the plug 3 is the right type for the socket 5, helping to avoid wrong connection. Without the mating between the keys 32 and the key grooves 11, the plug 3 cannot be pushed against the socket 5 up to a connecting position. This enables the worker to recognize that the plug 3 is not the right type for the socket 5.

Locking Step

When the plug 3 is appropriately inserted into the insertion cylinder 10 by the mating between the keys 32 and the key grooves 11, pushing the plug 3 against the insertion cylinder 10 in the axial direction causes the lock balls 9 held by the insertion cylinder 10 to get into the recess 39a on the first fixing ring 39 of the plug 3, as shown in the lower part of FIG. 7. This fixes the plug 3 to the socket 5. At this time, as shown in FIG. 5A, movement of the lock ball 9 to the outside in the radius direction is controlled by the sleeve 22.

Pre-Transfer Washing Step

Figure 13:
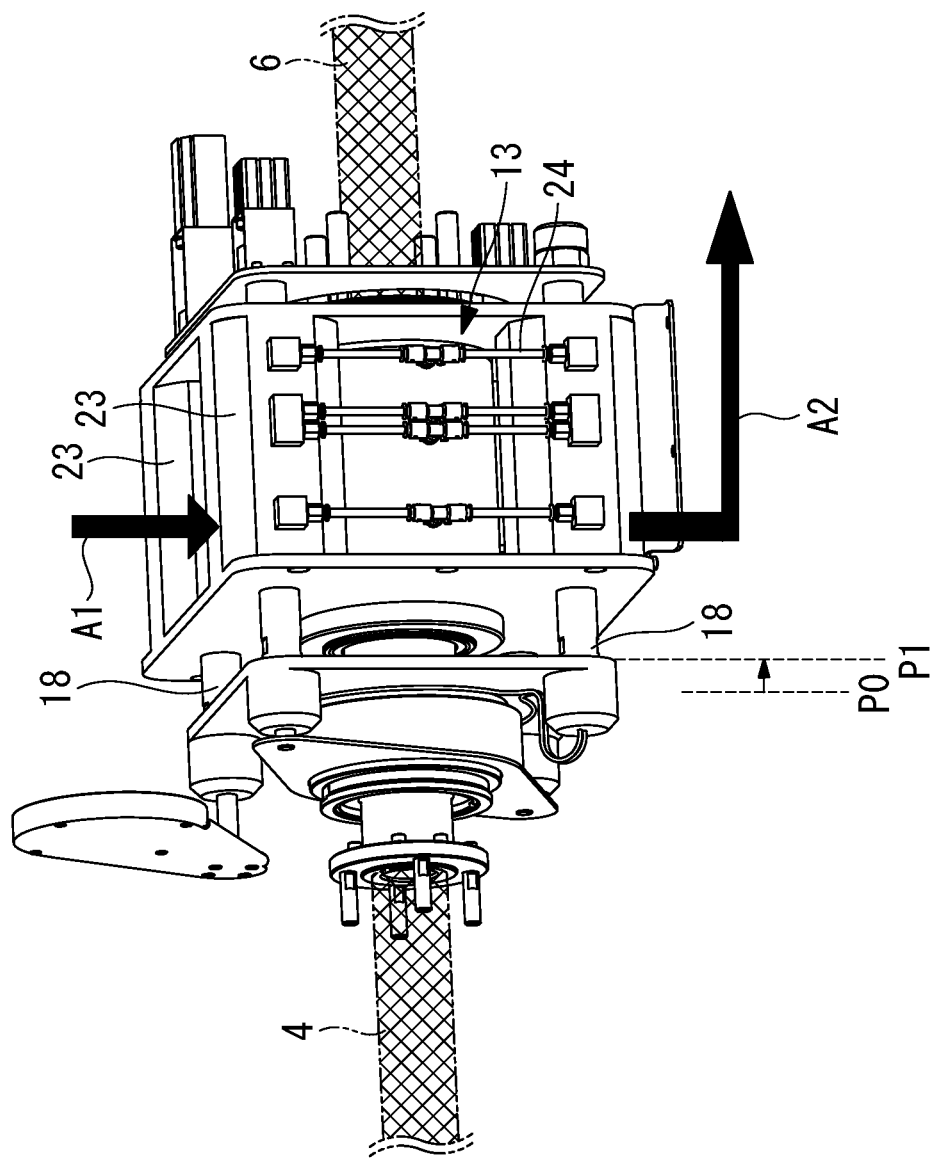
FIG. 13 is a perspective view illustrating a pre-transfer washing process with the plug at a first forward position.
Figure 14:
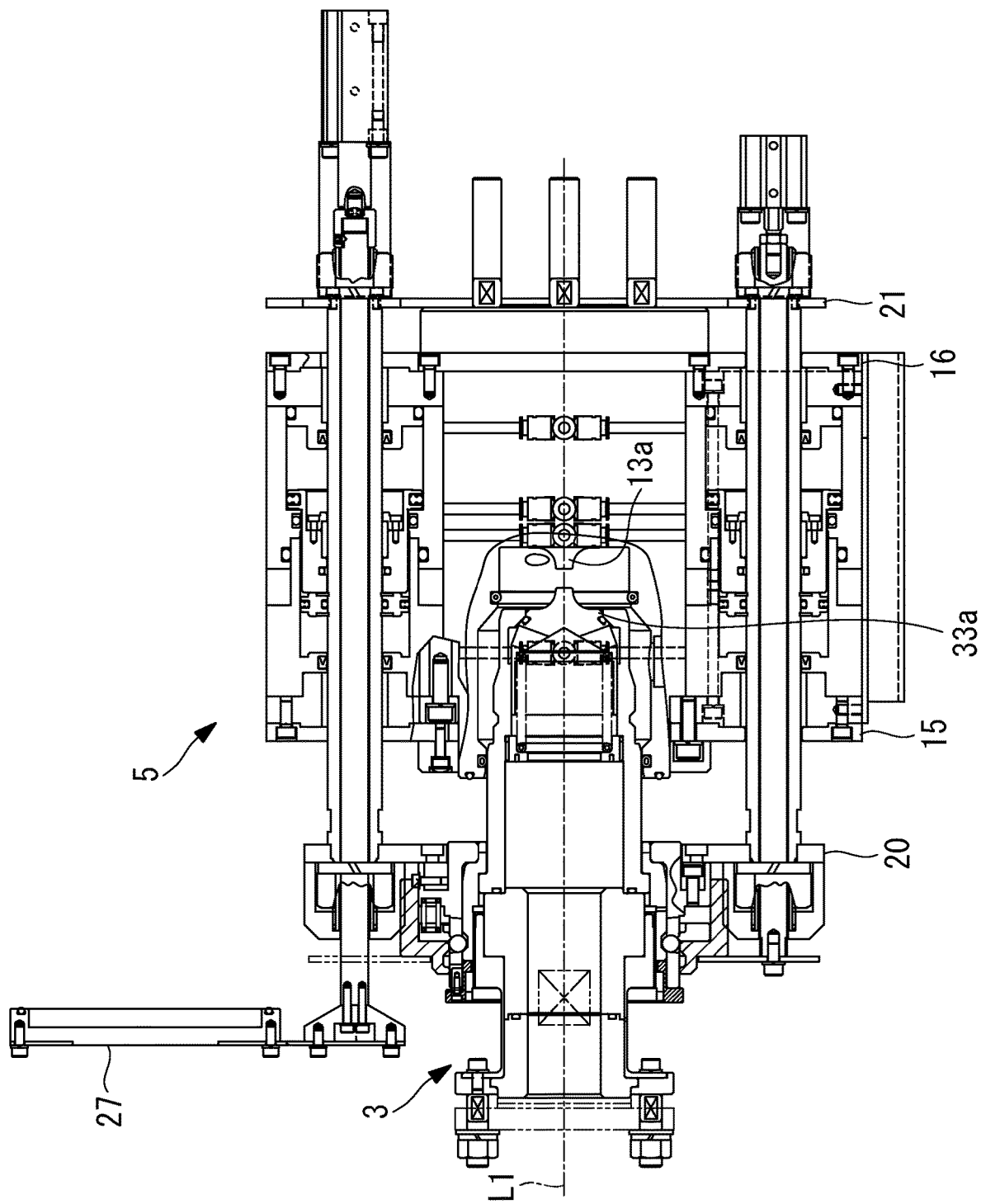
FIG. 14 is a longitudinal cross-sectional view illustrating the first forward position in FIG. 11.

As shown in FIG. 13, the plug 3 is displaced from the position shown in FIG. 12 to a first forward position P1 by being pulled toward the socket body 13. Specifically, as shown in FIG. 3B, this is automatically done under instructions of the controller by axially moving the support shaft bodies 18 with air supplied from the air supply pipes 24 to the corresponding cylinders 23. The longitudinal cross-sectional view of the first forward position P1 is illustrated in FIG. 14.

Then, as indicated by arrows A1 and A2 in FIG. 13, a space between the distal end of the plug 3 and the socket 5 is washed with pure water (see FIG. 10A), and then dried with inert gas, such as nitrogen. During the pre-transfer washing step, the valve body 33a (see FIG. 7) of the plug 3 and the valve body 13a of the socket 5 are at closed positions, blocking the respective channels.

Fluid Transfer Step

Figure 15:
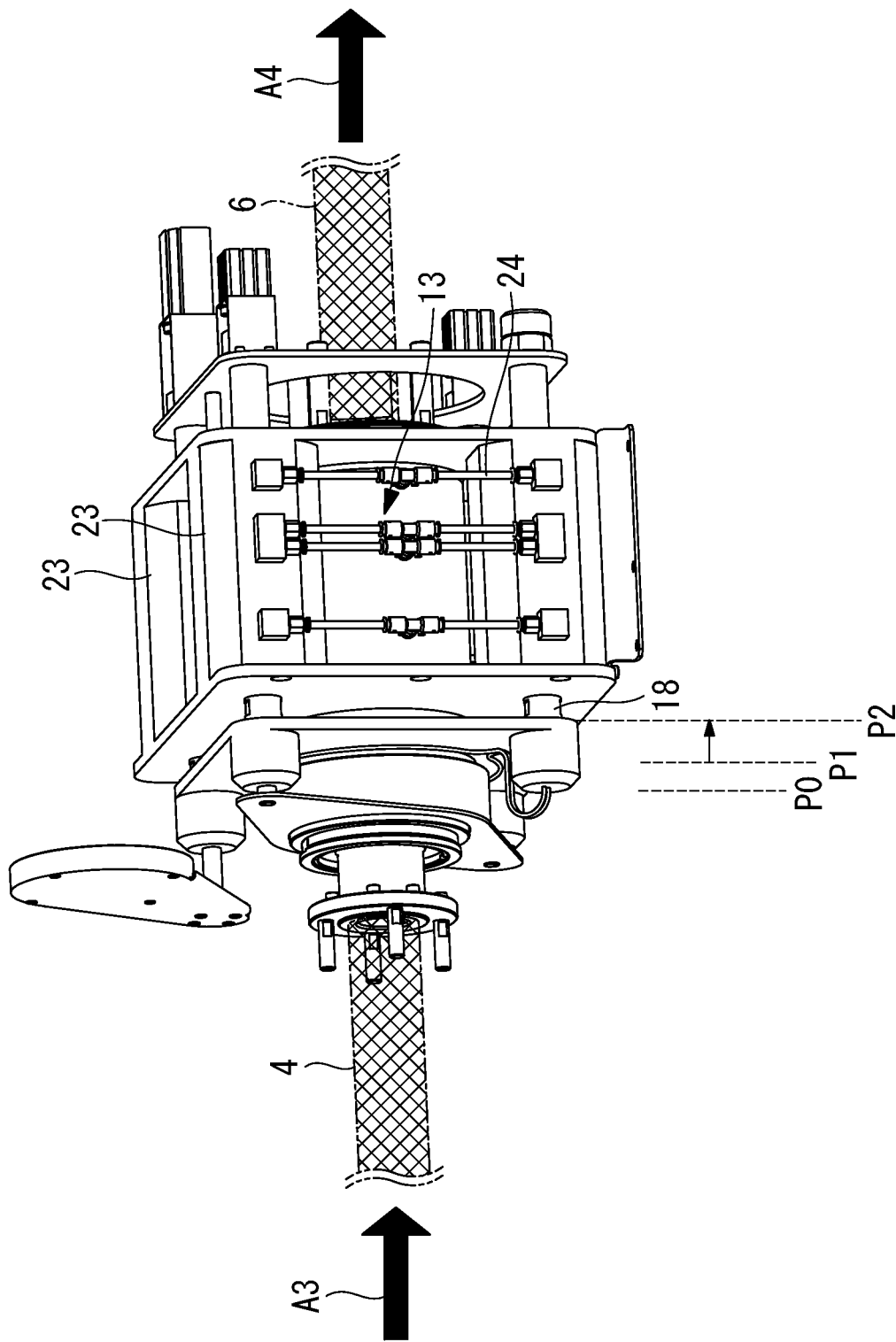
FIG. 15 is a perspective view illustrating a fluid transfer process with the plug at a second forward position.
Figure 16:
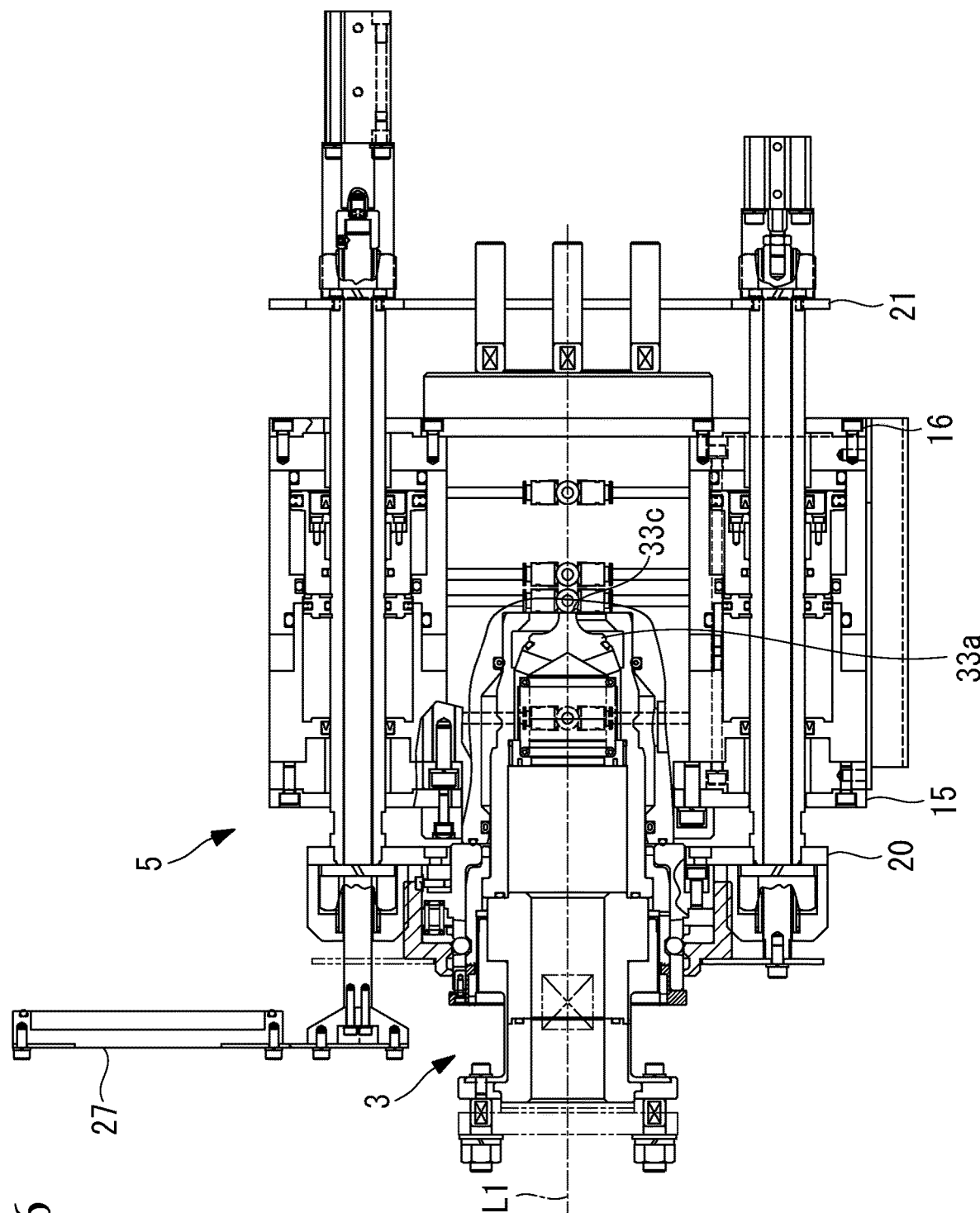
FIG. 16 is a longitudinal cross-sectional view illustrating the second forward position in FIG. 13.

Then, as shown in FIG. 15, the plug 3 is displaced from the first forward position P1 shown in FIG. 13 to a second forward position P2 which is the connecting position by being pulled further toward the socket body 13. Specifically, as shown in FIG. 3C, this is automatically done under instructions of the controller by axially moving the support shaft bodies 18 with air supplied from the air supply pipes 24 to the corresponding cylinders 23. The longitudinal cross-sectional view of the second forward position P2 is illustrated in FIG. 16.

In this way, the plug 3 can be advanced from an initial position P0 of FIG. 12 to the first forward position P1 of FIG. 13 and the second forward position P2 of FIG. 15 in two steps.

With the plug 3 at the second forward position P2, the protrusion 33c (see FIG. 7) of the valve body 33a of the plug 3 abuts against the protrusion of the valve body 13a of the socket 5 to push against each other, which displaces the valve bodies 33a, 13a to open positions to open the respective channels. This allows the fluid to be transferred from the tanker truck to the buffer tank in the building via the fluid transfer connector 1, as indicated by arrows A3 and A4.

Post-Transfer Washing Step

Figure 17:
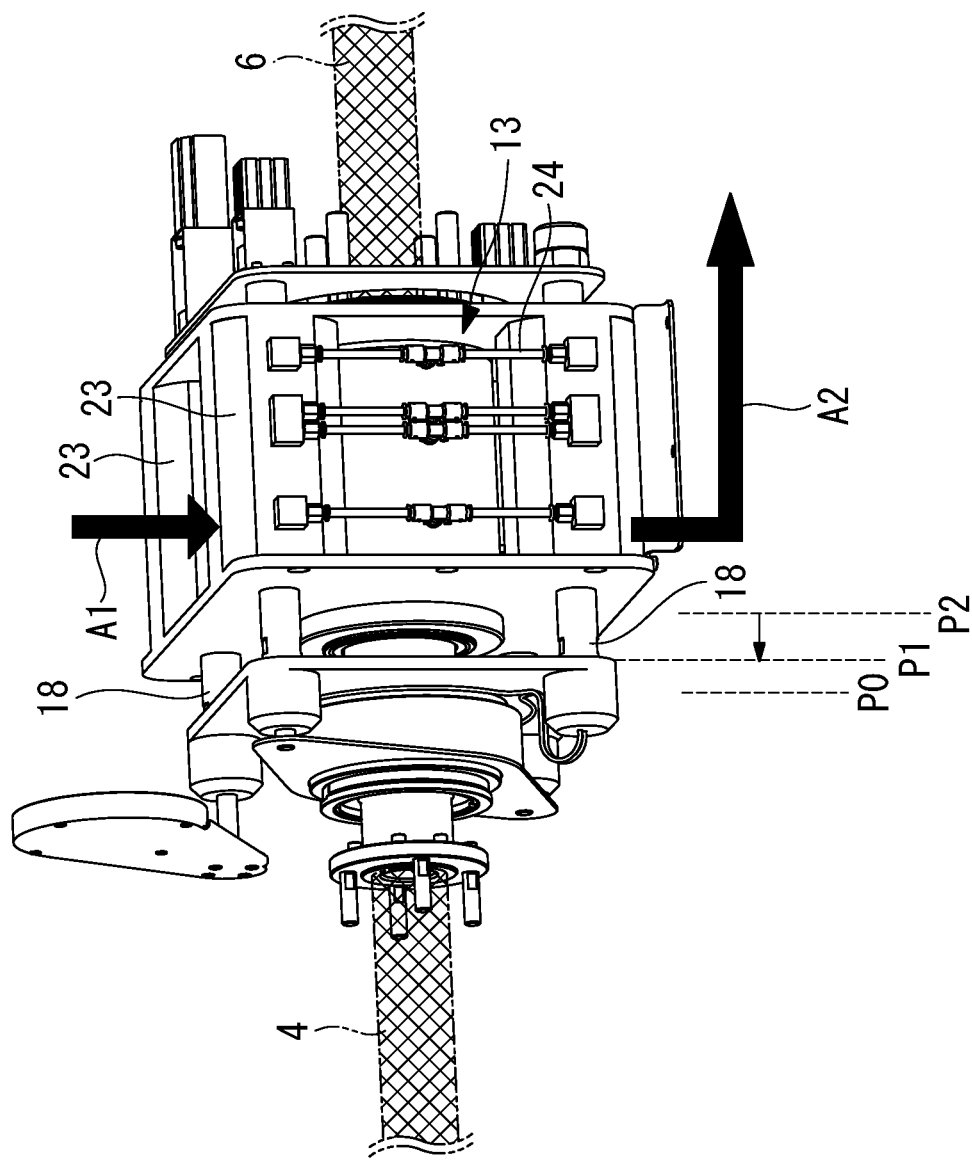
FIG. 17 is a perspective view illustrating a post-transfer washing process with the plug at the first forward position.

As shown in FIG. 17, upon completion of the fluid transfer, the plug 3 is retracted to the first forward position P1 as explained in FIG. 13. Then, the space between the distal end of the plug 3 and the socket 5 is washed with pure water (see FIG. 10A), as indicated by arrows A1 and A2 in FIG. 17, and then dried with inert gas, such as nitrogen. During the post-transfer washing step, the valve body 33a (see FIG. 7) of the plug 3 and the valve body 13a of the socket 5 are at closed positions, blocking the respective channels.

Removing Step

Upon completion of the post-transfer washing step shown in FIG. 17, the plug 3 is retracted to the initial position PO shown in FIG. 12, and under instructions of the controller, the sleeve driving plate 19 is driven to move the sleeve 22 toward the distal end of the plug 3 (toward the right side in FIG. 12). This makes the plug 3 unlocked from the lock balls 9 (see FIG. 5B), and the plug 3 is thus removed from the socket 5.

The present embodiment provides the following functions and effects.

Figure 10B:
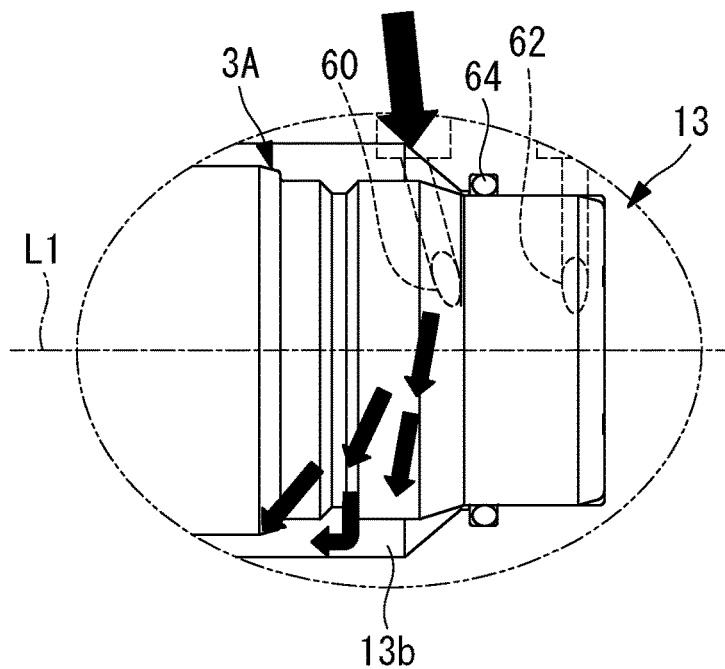
FIG. 10B is a longitudinal cross-sectional view illustrating a flow of the cleaning liquid with respect to FIG. 9B.

Since the cleaning liquid supply hole 60 is provided at a position opposite to the distal end of the plug body 3A with respect to the O-ring 64, even while a fluid is being transferred by connecting the plug body 3A and the socket body 13, even if the cleaning liquid leaks from the cleaning liquid supply hole 60 due to some trouble, since the cleaning liquid supply hole 60 is separated from the distal end of the plug body 3A by the O-ring 64, the cleaning liquid is prevented from being led to the distal end side of the plug body 3A and being mixed into the fluid being transferred as shown in FIG. 10B.

Since the cleaning liquid supply hole 60 is provided to be inclined toward the distal end side of the plug body 3A as shown in FIG. 9A, the cleaning liquid injected from the cleaning liquid supply hole 60 flows toward the distal end side of the plug body 3A (see FIG. 10A). This makes it possible to lead the cleaning liquid to the distal end side of the plug body 3A during cleaning and perform cleaning more effectively.

Since the gas supply hole 62 for supplying a gas into the plug body housing part 13b is provided in addition to the cleaning liquid supply hole 60, it is possible to inject the gas from a position different from the position where the cleaning liquid is supplied. This makes it possible to more effectively purge the interior of the plug body housing part 13b.

The gas supply hole 62 is provided at a position on the distal end side of the plug body 3A with respect to the O-ring 64. In this way, the gas supply hole 62 and the cleaning liquid supply hole 60 are distributed and provided on both sides of the O-ring 64, which allows effective arrangement even in a narrow space.

Note that although the present embodiment has been described using a liquid as the fluid to be transferred, the present disclosure is not limited to this, and the present embodiment is also applicable to a gas.

Furthermore, although the present embodiment has been described by taking the O-ring 64 as an example of the member for sealing the plug body 3A in the plug body housing part 13b, the present disclosure is not limited to this, and any other sealing members may be used if it can seal the plug body 3A liquid-tightly.

The invention claimed is:

1. A liquid transfer connector comprising:
   a plug having a plug body in which a first fluid channel is formed, the plug including a first valve which opens and closes the first fluid channel;
   a socket having a socket body in which a second fluid channel communicating with the first fluid channel is formed when the plug is connected, the socket including a second valve which opens and closes the second fluid channel;
   a plug body housing part provided in the socket body, that receives and houses a distal end of the plug body inserted therein at a time of connection, the plug body being formed along a central axis;
   a sealing member provided in the plug body housing part, that seals an outer periphery of the plug body inserted in the socket body at a connecting position where the first valve abuts against the second valve to push against each other to open the first fluid channel and the second fluid channel; and
   a cleaning liquid supply hole that supplies a cleaning liquid into the plug body housing part at a position opposite to the distal end of the plug body with respect to the sealing member, wherein
   the distal end of the plug body is provided on one side with respect to the sealing member along the central axis and the cleaning liquid supply hole is provided on the other side with respect to the sealing member along the central axis when the plug body is inserted in the socket body at the connecting position.

2. The fluid transfer connector according to claim 1, wherein the cleaning liquid supply hole is provided to be inclined with respect to the central axis toward the distal end side of the plug body.

3. The fluid transfer connector according to claim 1, further comprising a gas supply hole that supplies a gas into the plug body housing part in addition to the cleaning liquid supply hole.

4. The fluid transfer connector according to claim 3, wherein the gas supply hole is provided on the same side as at a position on the distal end side of the plug body with respect to the sealing member along the central axis.

* * * * *